US010781099B2

(12) United States Patent
Becker et al.

(10) Patent No.: US 10,781,099 B2
(45) Date of Patent: Sep. 22, 2020

(54) METERED ACID ACCELERATION OF HYDROGEN GENERATION USING SEAWATER AS A REACTANT

(71) Applicant: The United States of America as Represented by the Secretary of the Navy, San Diego, CA (US)

(72) Inventors: Carol A. Becker, Del Mar, CA (US); Wayne E. Glad, Del Mar, CA (US); Brandon J. Wiedemeier, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 14 days.

(21) Appl. No.: 16/019,645

(22) Filed: Jun. 27, 2018

(65) Prior Publication Data
US 2018/0305203 A1    Oct. 25, 2018

Related U.S. Application Data

(63) Continuation of application No. 15/415,659, filed on Jan. 25, 2017, now Pat. No. 10,179,733.

(51) Int. Cl.
*C01B 3/06* (2006.01)
*H01M 8/065* (2016.01)
(Continued)

(52) U.S. Cl.
CPC ............ *C01B 3/06* (2013.01); *B01J 19/0006* (2013.01); *C01B 3/061* (2013.01); *C01B 3/065* (2013.01);
(Continued)

(58) Field of Classification Search
CPC ........... C01B 3/06; C01B 3/065; C01B 3/061; H01M 8/04201; H01M 8/04208; H01M 8/065; B01J 19/0006; B01J 2219/00182
See application file for complete search history.

(56) References Cited

U.S. PATENT DOCUMENTS

| 2,534,533 | A | * | 12/1950 | Schlesinger | .............. C01B 6/00 423/288 |
| 2011/0070151 | A1 | * | 3/2011 | Braithwaite | ............ C01B 3/065 423/648.1 |
| 2013/0028809 | A1 | * | 1/2013 | Barton | ....................... B01J 7/02 422/187 |

OTHER PUBLICATIONS

Kliphus et al. "Study of Wake Generating System for an ASW Training Device", Department of the Navy Technical Report No. Navtradevcen 1297-1, (1984). (Year: 1964).*

(Continued)

*Primary Examiner* — Anthony J Zimmer
*Assistant Examiner* — Syed T Iqbal
(74) *Attorney, Agent, or Firm* — Naval Information Warfare Center, Pacific; Kyle Eppele; James McGee

(57) ABSTRACT

An underwater hydrogen generator can include a watertight reaction housing enclosing a metering chamber. The metering chamber can have an upper portion that terminates at a piston opening, and a lower portion that merges into a funnel, which can further terminate at a metering opening. The metering chamber can be filled with an acid accelerator, and the watertight reaction void can be partially filled with $NaBH_4$ in solution. The generator can further include a seawater float valve that can be in fluid communication between the external environment, the metering chamber and the void defined by the reaction housing. The float valve, metering chamber and reaction housing can cooperate to generate hydrogen when said generator is submerged, by allowing seawater to contact both the acid accelerator and the $NaBH_4$. The size of the metering opening can determine (Continued)

the rate at which acid accelerator is added to the NaBH$_4$ solution.

8 Claims, 15 Drawing Sheets

(51) Int. Cl.
*H01M 8/04082* (2016.01)
*B01J 19/00* (2006.01)
(52) U.S. Cl.
CPC ... *H01M 8/04201* (2013.01); *H01M 8/04208* (2013.01); *H01M 8/065* (2013.01); *B01J 2219/00182* (2013.01)

(56) References Cited

OTHER PUBLICATIONS

Becker-Glad et al., Acid Acceleration of Hydrogen Generation Using Seawater as a Reactant, International Journal of Hydrogen Energy (2016), http://dx.doi.org/10.1016/j.ijhydene.2016.02.132.
Kliphuis, J. et al., Study of Wake Generating System for an ASW Training Device, Department of the Navy Technical Report No. NAVTRADEVCEN 1297-1, (1984).
Schlesinger, Herbert E. et al., Sodium Borohydride, Its Hydrolysis and its Use as a Reducing Agent and in the Generation of Hydrogen, J. Am. Chem. Soc. 75(1): 215-219.

* cited by examiner

METERED ACID ACCELERATION OF HYDROGEN GENERATION USING SEAWATER AS A REACTANT

FEDERALLY-SPONSORED RESEARCH AND DEVELOPMENT

The United States Government has ownership rights in this invention. Licensing inquiries may be directed to Office of Research and Technical Applications, Space and Naval Warfare Systems Center, Pacific, Code 72120, San Diego, Calif., 92152; telephone (619) 553-5118; email: ssc_pac_t2@navy.mil, referencing NC 108836.

FIELD OF THE INVENTION

The present invention pertains generally to methods and apparatus for generating hydrogen. More particularly, the invention describes a method and apparatus to generate hydrogen gas, using seawater as a reactant in the presence of acid accelerators, rather than transition metal catalysts. The invention is particularly, but not exclusively, useful as an undersea method and apparatus for generating hydrogen while submerged, which can meter the acid accelerator in seawater into the hydrogen-containing material in seawater, in order to provide a sustained, controlled source of hydrogen for various underwater applications.

BACKGROUND OF THE INVENTION

As known in the prior art, metal hydrides are particularly useful for the generation of hydrogen gas whenever the use of compressed gas is inconvenient or infeasible due to storage considerations. The metal hydrides lead in hydrogen-generating capacity per unit weight. Sodium borohydride, for example, can react slowly with water, but more quickly in the presence of a transition metal catalyst, to liberate four moles of hydrogen gas per mole of the compound, or 2.4 liters $H_2$ gas per grams of compound (L/g) at room temperature, as shown in Equation (1):

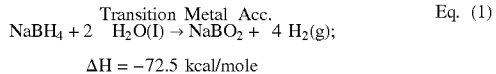

$$NaBH_4 + 2\ H_2O(l) \xrightarrow{\text{Transition Metal Acc.}} NaBO_2 + 4\ H_2(g);$$

$$\Delta H = -72.5\ \text{kcal/mole}$$

Eq. (1)

As can be seen from the above, transition metals can be used as accelerators for generation of hydrogen in many applications, and particularly in conjunction with sodium borohydride. In addition to its large hydrogen generating capability, sodium borohydride can have a number of advantages over the metals and other metal hydrides, in that it is readily available in granular form at a moderate price, it is stable for months in alkaline solution, its solubility in water is high, and it is relatively safe to handle, especially when it can be transported and stored in dry form. But for other applications, in particular those that envision that use of seawater for interacting with metal hydrides to generate hydrogen, transition metals can be ineffective as accelerators for reactions that involve sodium borohyride.

One possible solution could be to use acid accelerators, vice transition metal catalysts, when generating hydrogen from metal hydrides and water. Prior studies are known in the art for describing the effect of acid accelerators and catalytic accelerators on the evolution of hydrogen gas from sodium borohydride, but in pure (DI) water. Other studies in the prior art can describe the evolution of hydrogen gas from lithium borohydride using steam as an accelerator. There is also prior art that can describe the generation of hydrogen gas from metal hydrides and seawater, as opposed to pure water, using acid accelerator $NaHSO_4$. But in the prior art, the disclosed methodology refers to an open system and can be only thirty to fifty percent efficient. This can be an ineffective efficiency level for many applications, especially for applications which are space or weight-limited, and would require that the amount of acid accelerator used be kept to a minimum.

In view of the above, it can be an object of the present invention to provide methods and apparatus for generating hydrogen that use acid accelerators, instead of transition metal accelerators. Another object of the present invention can be to provide methods and apparatus for generating hydrogen that use seawater as a reactant in hydrogen generation, which can allow for subsea hydrogen generation without having to transport DI water reactant to the reaction site. Another object of the present invention can be to provide methods and apparatus for generating hydrogen with starting materials that are stable for long periods of time, for ease of storage. Still another object of the present invention can be to provide methods and apparatus for generating hydrogen that are sufficiently efficient for undersea naval applications. Yet another object of the present invention can be to provide methods and apparatus for generating hydrogen that can generate sufficient hydrogen yield to function as part of a hydrogen source for an underwater fuel cell. Yet another object of the present invention can be to provide methods and apparatus for generating hydrogen using seawater that can be easy to implement in a cost-effective manner.

SUMMARY OF THE INVENTION

An underwater hydrogen generator in accordance with several embodiments of the present invention can include a metering casing defining a metering chamber and a watertight reaction housing enclosing the metering casing so that the casing and housing are concentric. The watertight reaction housing and casing can cooperate to define an annular reaction void. The metering casing can have an upper portion that terminates at a piston opening, and a lower portion that merges into a funnel, which can further terminate at a metering opening. The metering chamber can be filled with an acid accelerator, and the watertight reaction void can be partially filled with the sodium borohyride ($NaBH_4$) in solution. The underwater hydrogen generator can further include a seawater float valve in fluid communication between the external environment and the metering chamber, as well as the reaction void.

When the generator is submerged, the float valve, metering casing and reaction housing can cooperate to generate hydrogen by allowing seawater to flow into metering chamber and reaction void to contact both the acid accelerator and the $NaBH_4$. A weighted piston can be inserted into the piston opening, to accomplish a syringe-like action and urge the acid accelerator/seawater combination through the metering opening when the generator is submerged. The size of the metering opening can determine the rate at which acid accelerator is added to the $NaBH_4$ solution. The accelerator can be $B_2O_3$ or $NaHSO_4$, although other accelerators could be used. A hydrogen output port can be formed in the reaction housing, and the generated hydrogen can be routed through an exit port on the generator and routed into a fuel cell that can be in fluid communication with the hydrogen exit port.

BRIEF DESCRIPTION OF THE DRAWINGS

The novel features of the present invention will be best understood from the accompanying drawings, taken in conjunction with the accompanying description, in which similarly-referenced characters refer to similarly-referenced parts, and in which.

DETAILED DESCRIPTION OF THE EMBODIMENTS

Figure 1:
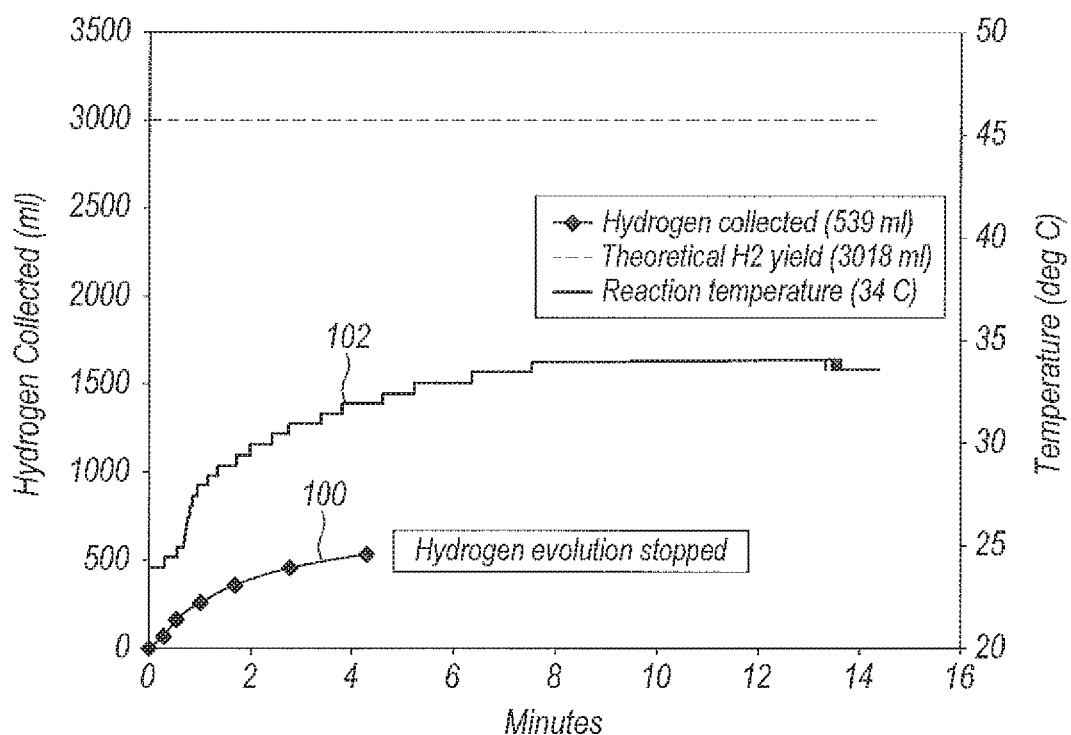
FIG. 1 is a graph of hydrogen collected and reaction temperature versus time for bulk addition of $NaBH_4/CoCl_2$ pellets to seawater.
Figure 2:
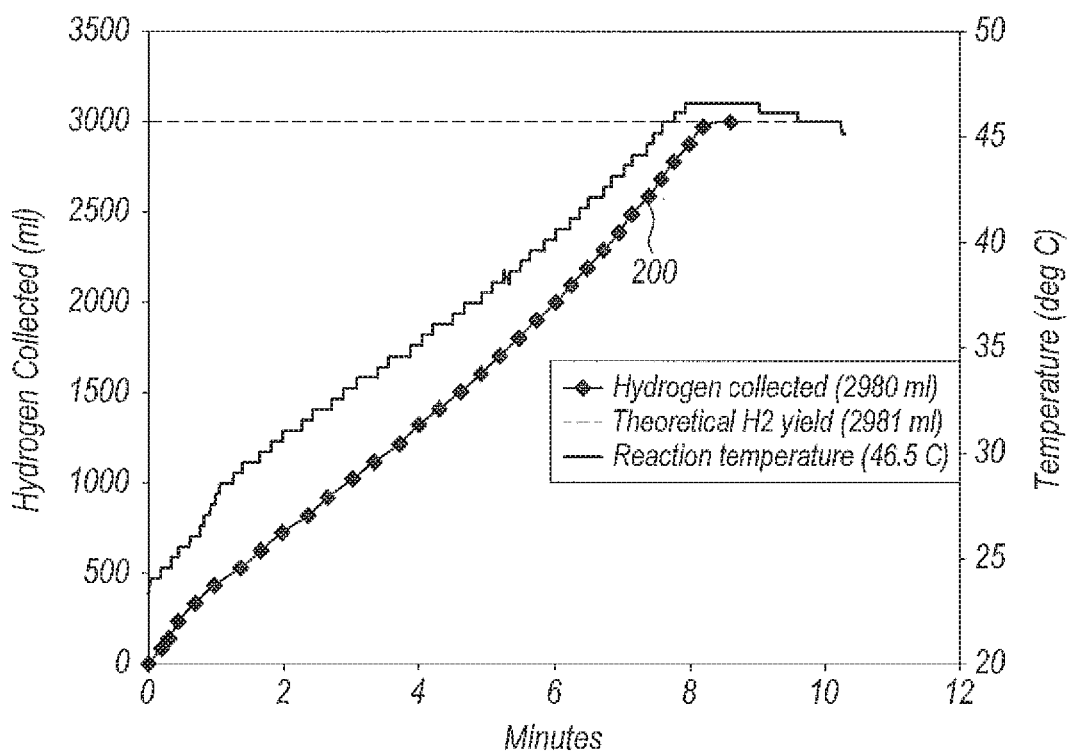
FIG. 2 is a graph of yield and reaction temperature versus time for bulk addition of $NaBH_4/CoCl_2$ pellets to 35 parts per thousand NaCl solution.

Referring initially to FIGS. 1-2, FIG. 1 is a graph of yield (curve 100) and temperature (curve 102) versus time for bulk addition of $NaBH_4/CoCl_2$ pellets to seawater. In FIG. 1, only 18% (539 ml) of the theoretical yield of $H_2$ gas (3018 ml) was collected before the reaction stopped dead. FIG. 2 shows an example of bulk addition of NaBH4/CoCl2 pellets to 35 parts per thousand NaCl solution. The reaction goes to completion (yield curve 200), which can show that the Na+ and Cl− ions present in seawater are not responsible for the dramatic inhibition of $H_2$ gas formation shown in FIG. 1.

Figure 3:
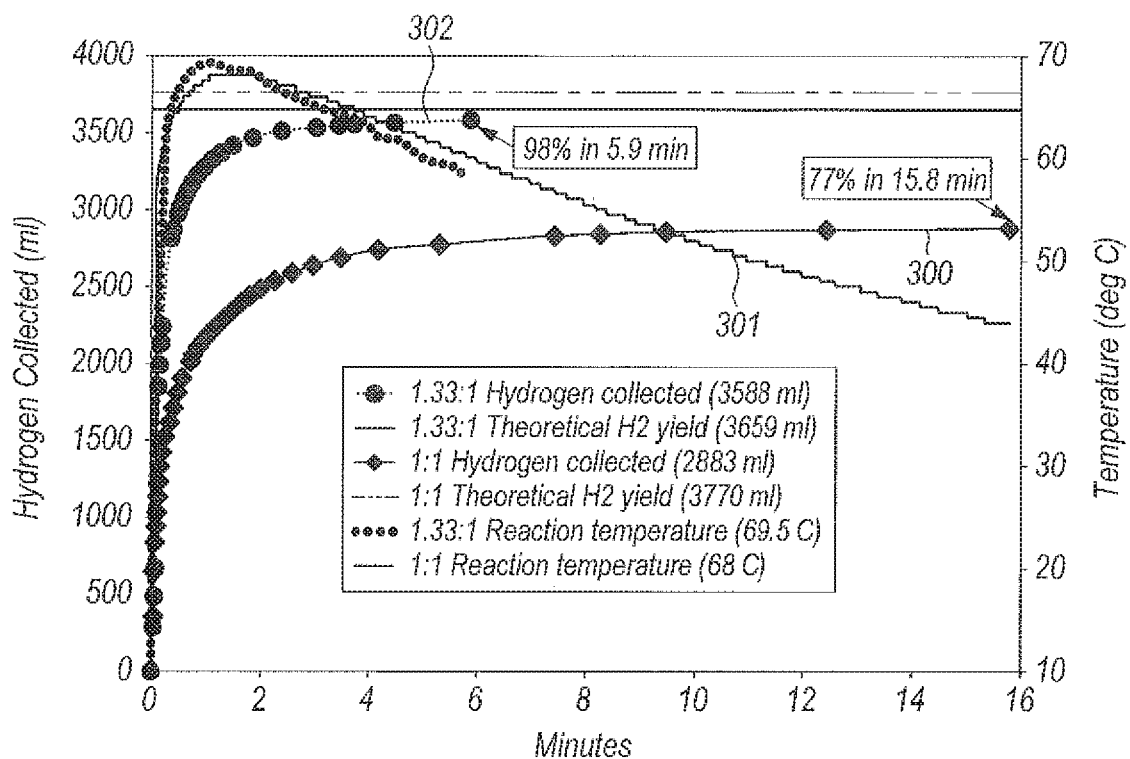
FIG. 3 is a graph of yield and reaction temperature versus time for bulk addition of $NaBH_4$ granules to accelerator $NaHSO_4$ dissolved in seawater in the ratio g $NaHSO_4$:g $NaBH_4$=1:1 and 1.33:1.

Referring now to FIG. 3, FIG. 3 is a graph of yield (curve 300) and temperature (curve 301) versus time for the use of acid accelerators, as opposed to transition metal catalysts which may be poisoned by the impurities present in seawater, to liberate $H_2$ gas from $NaBH_4$ using seawater, rather than pure water, as the reactant. For acid accelerator $NaHSO_4$, one way to write the hydrogen generation equation can be:

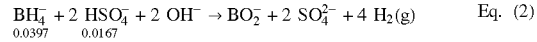

Eq. (2)

Measurements of $NaHSO_4$ in seawater using the ratios g $NaHSO_4$:g $NaBH_4$=1:1 and g $H_2O$:g $NaBH_4$=20:1 can be shown in FIG. 3. The reaction goes to 77% completion in 15.8 minutes (curve 300). The data in FIG. 3 can be taken to mean that with $NaHSO_4$ the reaction will never go to completion without the addition of a considerable excess of accelerator (g $NaHSO_4$/g $NaBH_4$>1). The reaction in seawater can be made to go to completion by increasing the ratio g NaHSO$_4$/g NaBH$_4$ to 1.33:1. This data is also shown in FIG. 3. The reaction goes to 98% completion in 5.9 minutes, as shown by curve 302 in FIG. 3. Results for the seawater runs can be given in Table 1.

TABLE 1

Seawater as a Reactant Using Accelerator NaHSO$_4$
Ratio of g seawater:g NaBH$_4$ = 20:1

| Delivery Method | Ratio g NaHSO$_4$:g NaBH$_4$ | Tube ID (inch) | Peak Temperature (deg C.) | % Completion | Reaction time (min) |
|---|---|---|---|---|---|
| Bulk | 1:1 | NA | 68 | 77 | 15.8 |
| Bulk | 1.33:1 | NA | 69.5 | 98 | 5.9 |
| Peristaltic pump | 1.33:1 | 1/16 | 54.5 | 99.4 | 37.4 |

Even with the 1.33:1 ratio, the proportions are hardly stoichiometric. Moles of reactants used in the present experiment are given above for BH$_4^-$ and HSO$_4^-$ in Eq. (2). There can be a considerable stoichiometric shortfall of HSO$_4^-$.

Figure 4:
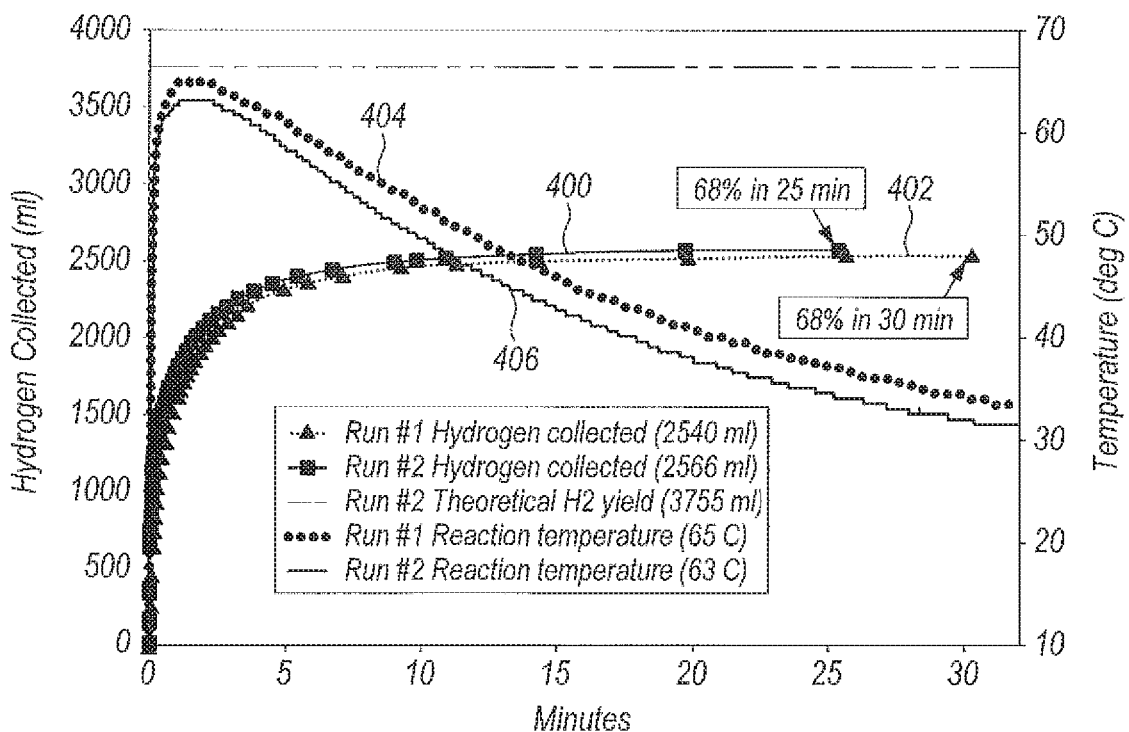
FIG. 4 is a graph of yield and reaction temperature versus time for Bulk addition of $NaBH_4$ granules to $NaHSO_4$ dissolved in DI water in the ratio g $NaHSO_4$:g $NaBH_4$=1:1.

Referring now to FIG. 4, FIG. 4 is a graph of yield (curves 400, 402) and temperature (curves 404, 406) versus time for two reaction runs of NaHSO$_4$ in DI water. NaBH$_4$ granules are added in bulk to NaHSO$_4$ dissolved in DI water in the ratio g NaHSO$_4$:g NaBH$_4$=1:1. 68% completion is achieved, as shown by curve 400. With NaHSO$_4$ as accelerator, the reaction will not go to completion in DI water or in seawater (FIG. 3) with a 1:1 ratio. An excess of accelerator is needed. The reaction in DI water goes to 68% completion in 30 minutes, as shown by curve 402. The reaction in seawater is about twice as fast as in DI water, i.e., 15.8 (curve 300, FIG. 3) vs. 30 minutes (curve 402, FIG. 4) for the 1:1 ratio. The greater percentage of completion in seawater (77% vs. 68%) may be due to the slight buffering capability of seawater which will keep the solution more acidic so that NaBH$_4$ can continue to react to liberate H$_2$ (NaBH$_4$ can be stored for a year in alkaline water, as known in the prior art). The reaction in DI water is highly reproducible. In two experiments, the reaction stopped at 68% completion (FIG. 4, curves 400 and 402). Results for the DI water runs using acid accelerator NaHSO$_4$ can be seen in Table 2.

TABLE 2

DI Water as a Reactant Using Accelerator NaHSO$_4$
Ratio g NaHSO$_4$:g NaBH$_4$ = 1:1; ratio g H$_2$O:g NaBH$_4$ = 20:1

| Delivery Method | Tube ID (inch) | Peak Temperature (deg C.) | % Completion | Reaction time (min) |
|---|---|---|---|---|
| Bulk | NA | 65 | 68 | 30 |
| Bulk | NA | 63 | 68 | 25 |

Figure 5:
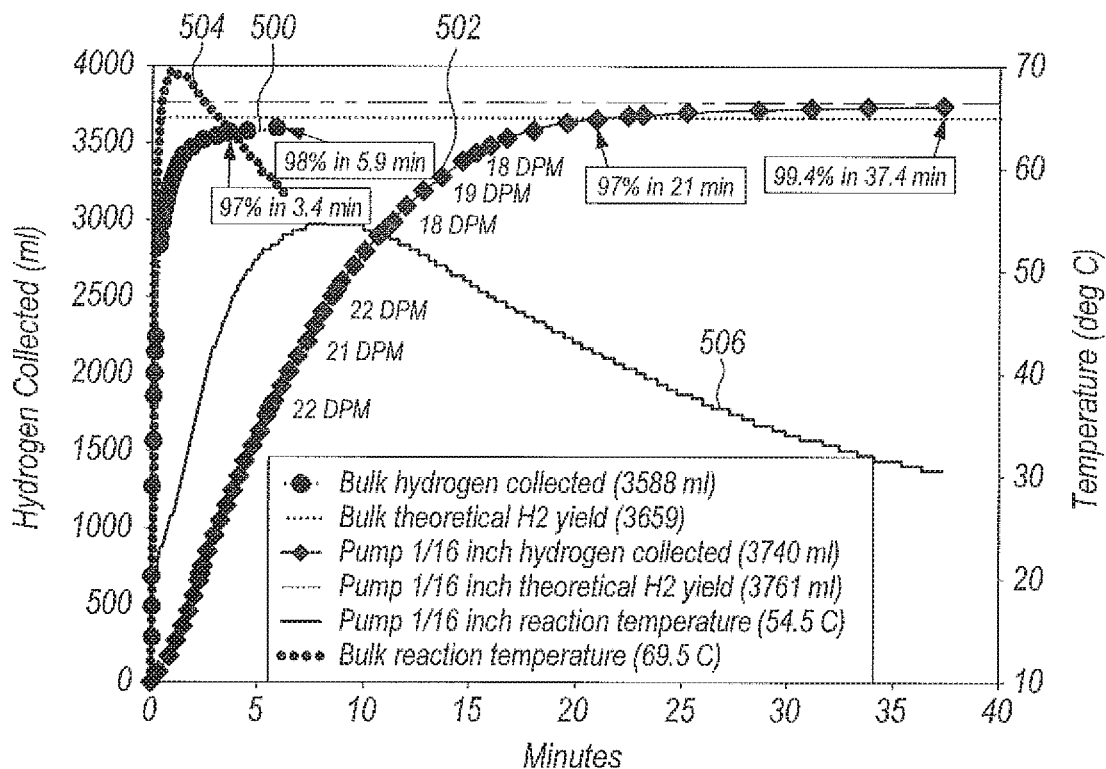
FIG. 5 is a graph of yield and reaction temperature versus time for that can be achieved with acid accelerator $NaHSO_4$ in seawater using the some of the delivery methods of the present invention.

Referring now to FIG. 5, FIG. 5 a graph of hydrogen yield (curve 500) and temperature (curve 504) versus time that shows the range of reaction times obtainable with NaHSO$_4$ in seawater. When NaBH$_4$ is added in bulk to NaHSO$_4$ (curve 500), the reaction can be complete in 5.9 minutes. Reversing the order of addition, NaHSO$_4$ is metered into NaBH$_4$ using the peristaltic pump configuration described more fully below; the reaction is complete in 37.4 minutes (curve 502). Note that when NaHSO$_4$ is metered in, the volume (curve 502) and temperature (curve 506) curves are smooth, as opposed to undulating, since no hydrogen bubbles are being formed in the delivery line. The time to 97% completion with 1/16$^{th}$ tube is 21 minutes (curve 502).

Figure 13:
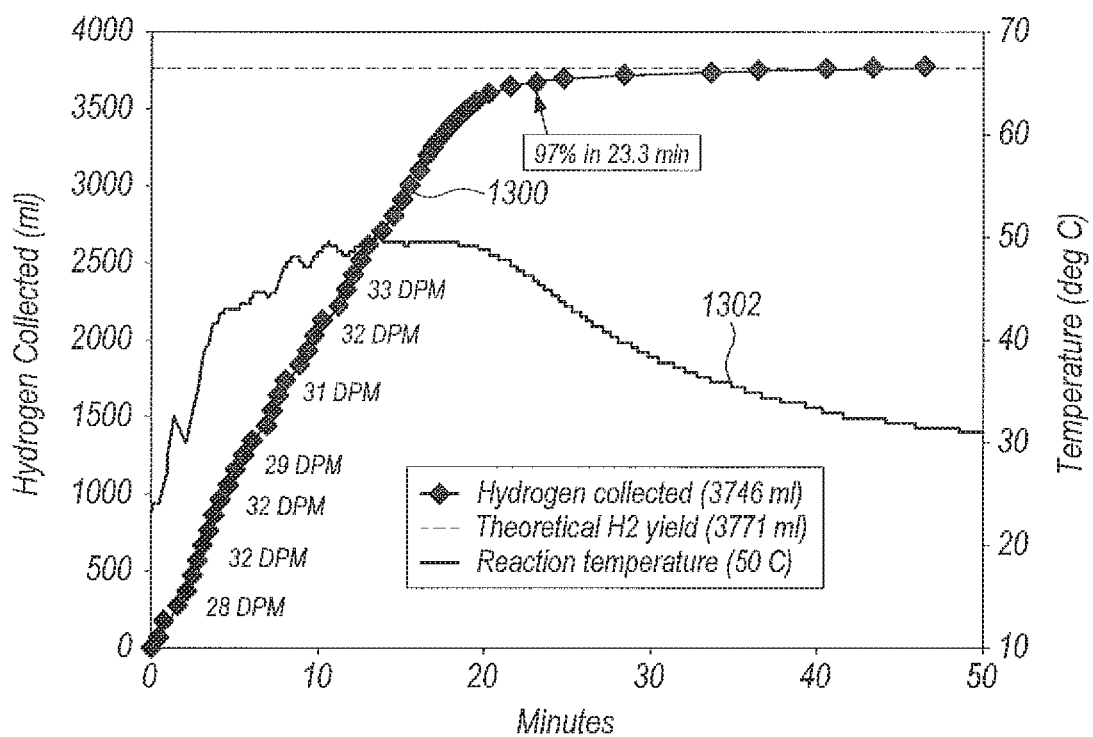
FIG. 13 is a graph of yield and reaction temperature versus time for a pump method for metering $NaBH_4$ dissolved in seawater into $B_2O_3$ in seawater using a peristaltic pump with $\frac{1}{16}^{th}$ inch inside diameter tubing.

This compares with 23.3 minutes for B$_2$O$_3$ with 1/16$^{th}$ tube into which NaBH$_4$ was metered (See FIG. 13, which describes this aspect more fully below).

The acid accelerator proposed for the present invention in some embodiments can be boric oxide, B$_2$O$_3$, which, unlike the transition metal catalysts, takes part in the reaction:

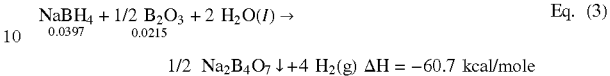

$$\text{NaBH}_4 + 1/2\ \text{B}_2\text{O}_3 + 2\ \text{H}_2\text{O}(l) \rightarrow \qquad \text{Eq. (3)}$$
$$\phantom{\text{NaBH}_4}_{0.0397} \phantom{+ 1/2\ }_{0.0215}$$
$$1/2\ \text{Na}_2\text{B}_4\text{O}_7 \downarrow + 4\ \text{H}_2(g)\ \Delta H = -60.7\ \text{kcal/mole}$$

The reaction product disodium tetraborate, commonly known as borax, can precipitate out and in some embodiments can be recovered from the reaction mixture. Borax has many uses in the prior art, i.e., detergent booster and multi-purpose household cleaner. Moles of reactants for NaBH$_4$ and B$_2$O$_3$ that can be used for the present invention according to several embodiments can be given above in Eq. (3). For the mole ratio cited in Eq. (3), there can be a slight stoichiometric excess of B$_2$O$_3$, which can ensure that the reaction will go to completion.

Figure 6:
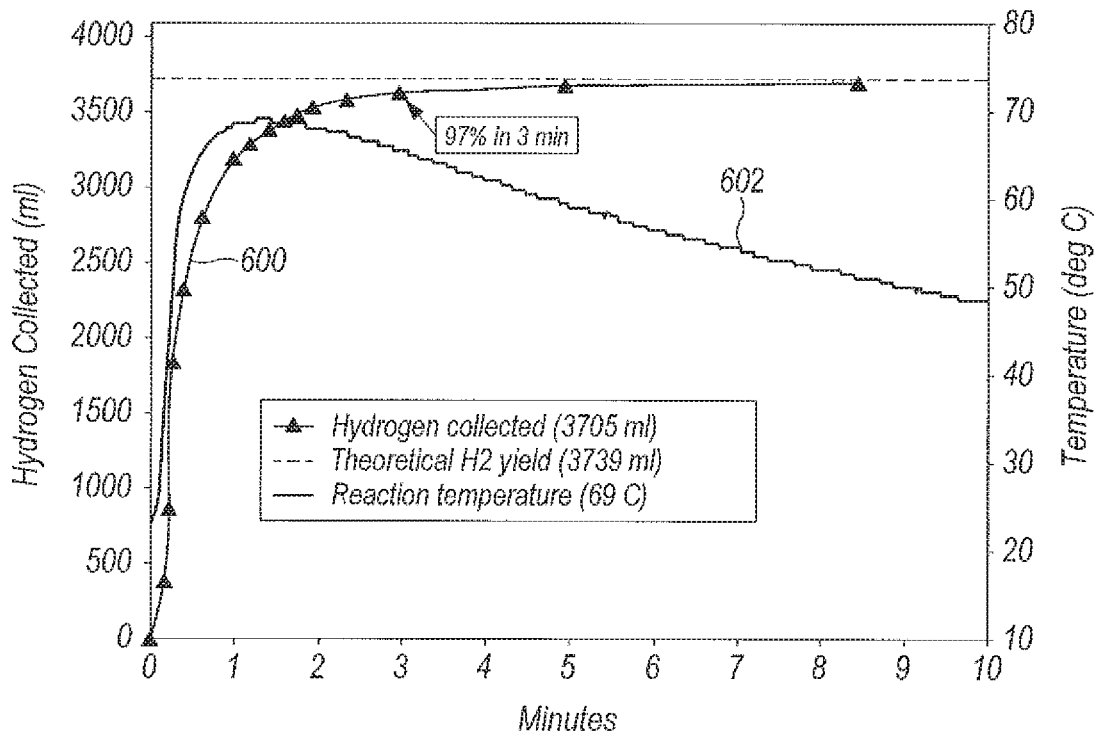
FIG. 6 is a graph of yield and reaction temperature versus time for bulk addition of $NaBH_4$ granules to acid accelerator $B_2O_3$ in DI water in the ratio g $B_2O_3$:g $NaBH_4$=1:1.

Referring now to FIG. 6, FIG. 6 is a graph of yield (curve 600) and temperature (curve 602) versus time that can illustrate the use of B$_2$O$_3$ to liberate H$_2$ from sodium borohydride in pure water. Using the ratio g B$_2$O$_3$:g NaBH$_4$=1:1 and the ratio g H$_2$O:g NaBH$_4$=20:1, the bulk reaction can occur relatively quickly, going to 97% completion in three minutes as shown by curve 600 in FIG. 6.

Figure 7:
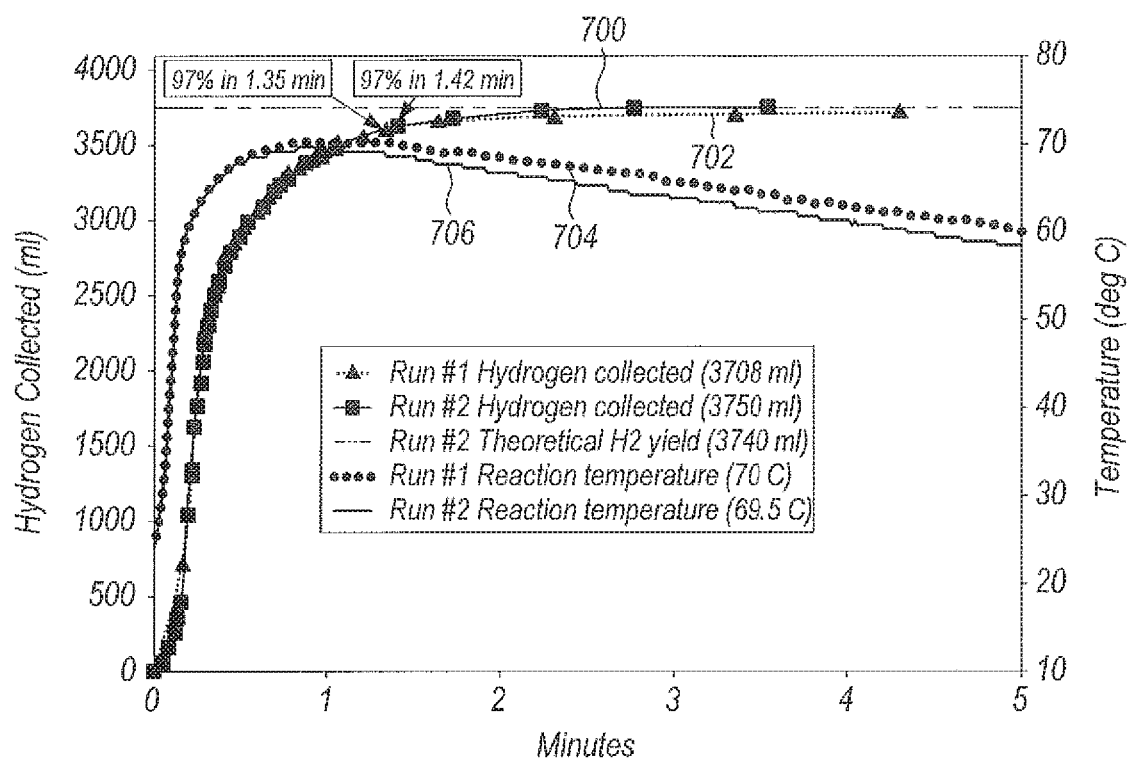
FIG. 7 is a graph of yield and reaction temperature versus time for bulk addition of $NaBH_4$ granules to acid accelerator $B_2O_3$ in seawater in the ratio g $B_2O_3$:g $NaBH_4$=1:1.

FIG. 7 is a graph of yield (curves 700, 702) and reaction temperature (curves 704, 706) versus time for the bulk reaction but for two reaction runs of unfiltered seawater rather than pure water. In unfiltered seawater, the reaction can go to 97% completion in less than 1.5 minutes. Two sets of seawater data are displayed in FIG. 7. As shown in FIG. 7, the curves 700 and 702 are nearly superimposable, and the reaction times are 1.35 and 1.42 minutes. This can mean that seawater does not choke B$_2$O$_3$; in fact using B$_2$O$_3$ the reaction in seawater is about twice as fast as in pure water, which can indicate the presence of a charged transition state that is stabilized by the ions in seawater.

The above embodiments demonstrate a relatively brief time to completion using boric acid (B$_2$O$_3$) as the accelerator. For several embodiments, it may be advantageous to slow down the reaction. In such cases, B$_2$O$_3$ can be made to liberate hydrogen more slowly by dripping (metering) the more soluble NaBH$_4$ into the less soluble B$_2$O$_3$ in a controlled manner. The metering can be done in a variety of ways; such as a manual drip (gravity or otherwise) using an addition funnel, or an automatic delivery method using a peristaltic pump. These methods can be described more fully below, and other delivery methods could certainly be used.

Figure 8:
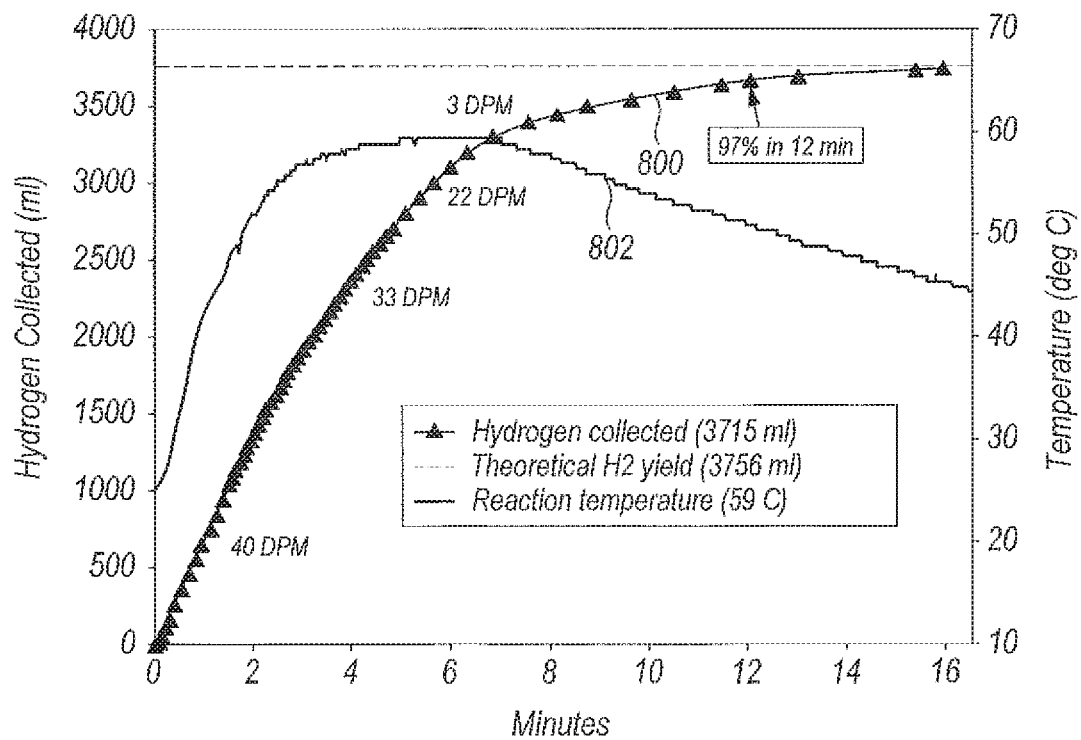
FIG. 8 is a graph of yield and reaction temperature versus time for drop wise delivery of $NaBH_4$ dissolved in DI water into $B_2O_3$ in DI water.

Referring now to FIG. 8, FIG. 8 is a graph of yield (curve 800) and reaction temperature (curve 802) versus time for the reaction in DI water resulting from manual dripping using an addition funnel. As the hydrostatic head in the addition funnel decreases, the drip rate of NaBH$_4$ solution also decreases, in this case from its initial value of 40 drops per minute to its final value of 3 drops per minute. The metered reaction of B$_2$O$_3$ in DI water can go to 97% completion in 12 minutes (curve 800). This can be mitigated by the use of a weighted piston that can float above the funnel volume. The piston adds and can overshadow the weight of the water in the funnel thereby metering more evenly. If designed correctly, the metering can be made consistent enough to be unnoticeable.

Figure 9:
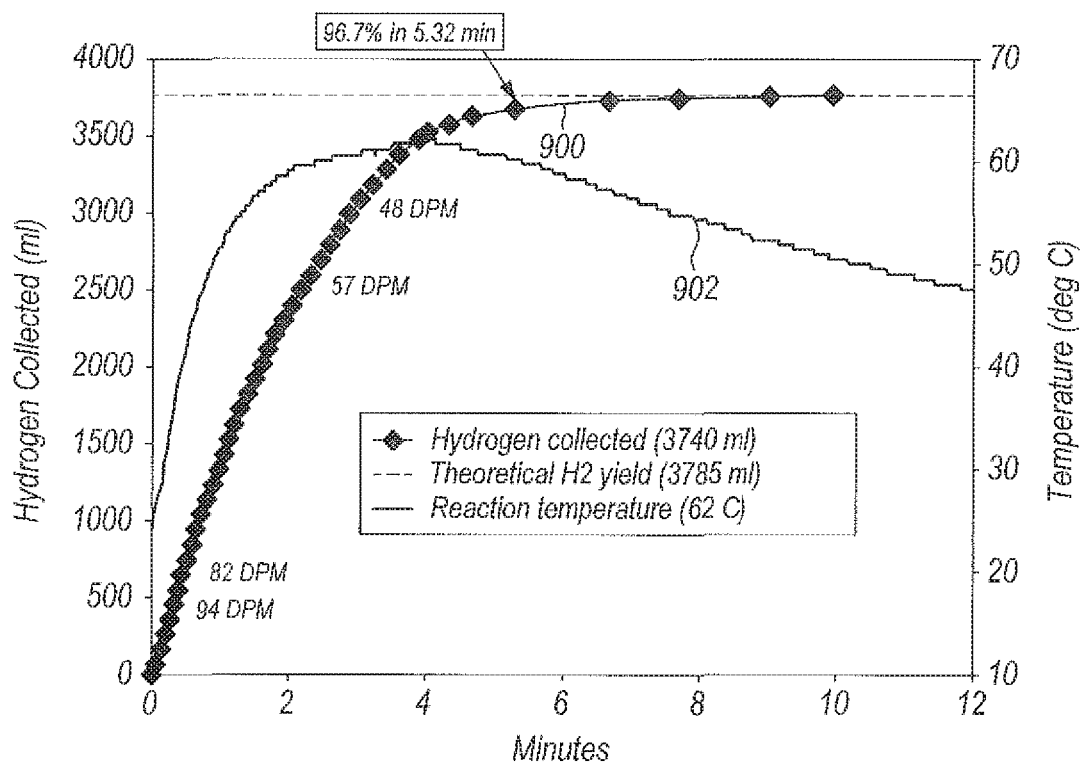
FIG. 9 is a graph of yield versus time for dropwise delivery of $NaBH_4$ dissolved in seawater into $B_2O_3$ in seawater.

The analogous reaction of $B_2O_3$ in seawater with an addition funnel can be seen in FIG. 9. FIG. 9 is a graph of yield (curve 900) and reaction temperature (curve 902) versus time for the reaction in seawater resulting from manual dripping using an addition funnel. As indicated by curve 900, the metered reaction in seawater goes to 97% completion in 5.32 minutes, more than 2 times faster than in DI water (See FIG. 8, curve 800). In FIG. 9, the drip rate of $NaBH_4$ solution can decrease from 94 drops per minute to 48 drops per minute. The decrease in drip rate in seawater (from 94 to 48 drops per minute) versus DI water (from 40 to 22 drops per minute) can be the reason for the difference in reaction time between seawater and DI water, the decreased time in seawater can be due to the higher drip rate. It should also be appreciated that when using $B_2O_3$, if the drip rate in seawater is not made to be faster, the by-product of hydrogen production, solid $NaBO_2$ can have a tendency to clog up the funnel neck and opening, which can further cause the drip rate to slow down to 0 drops per minute, i.e., before all the $NaBH_4$ has been delivered.

Figure 10:
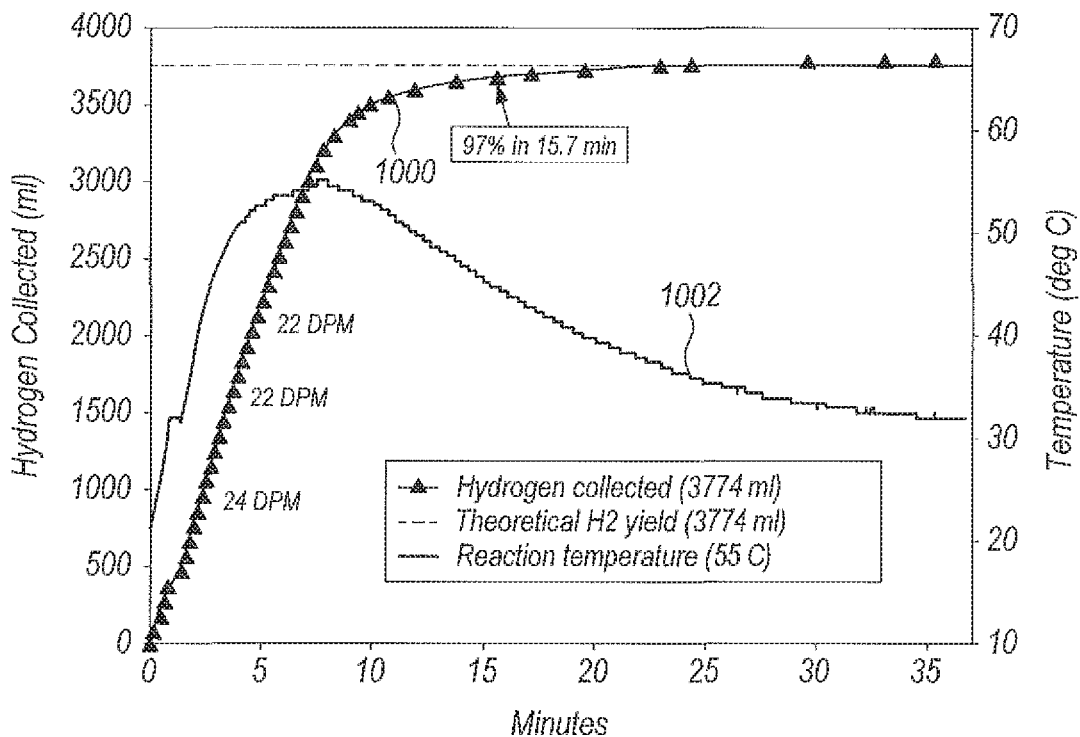
FIG. 10 is a graph of yield and reaction temperature versus time for a pump method for metering $NaBH_4$ dissolved in DI water into $B_2O_3$ in DI water using a peristaltic pump with $\frac{1}{8}^{th}$ inch inside diameter tubing.
Figure 11:
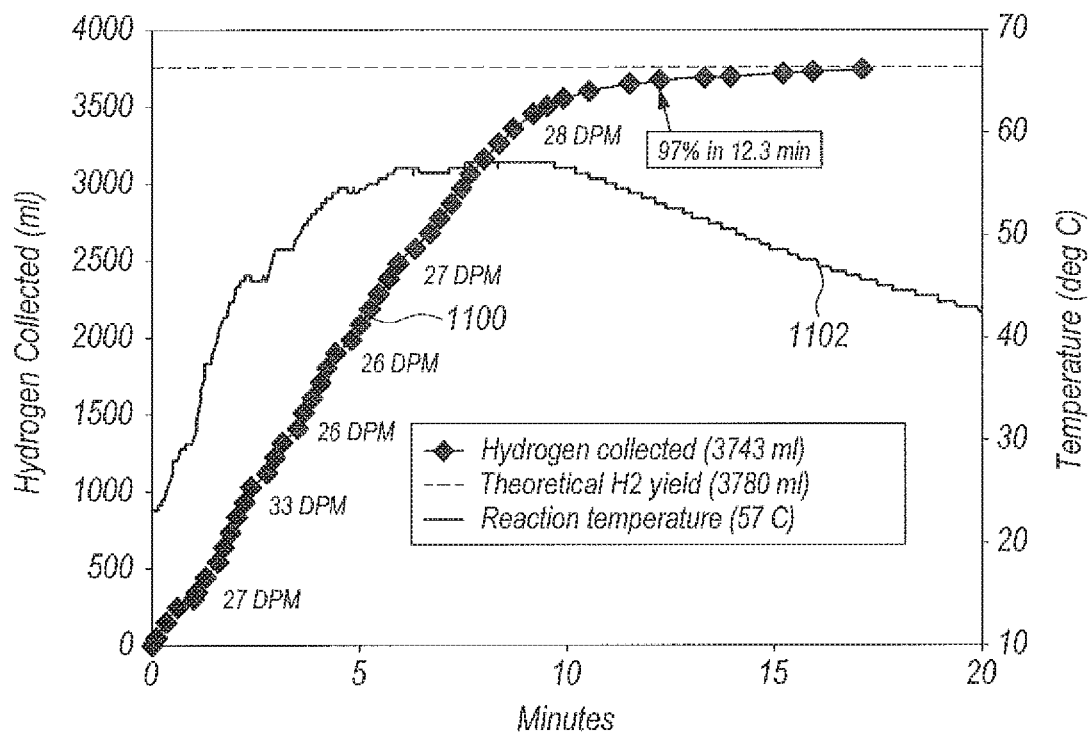
FIG. 11 is a graph of yield and reaction temperature versus time for a pump method for metering $NaBH_4$ dissolved in seawater into $B_2O_3$ in seawater using a peristaltic pump with $\frac{1}{8}^{th}$ inch inside diameter tubing.
Figure 12:
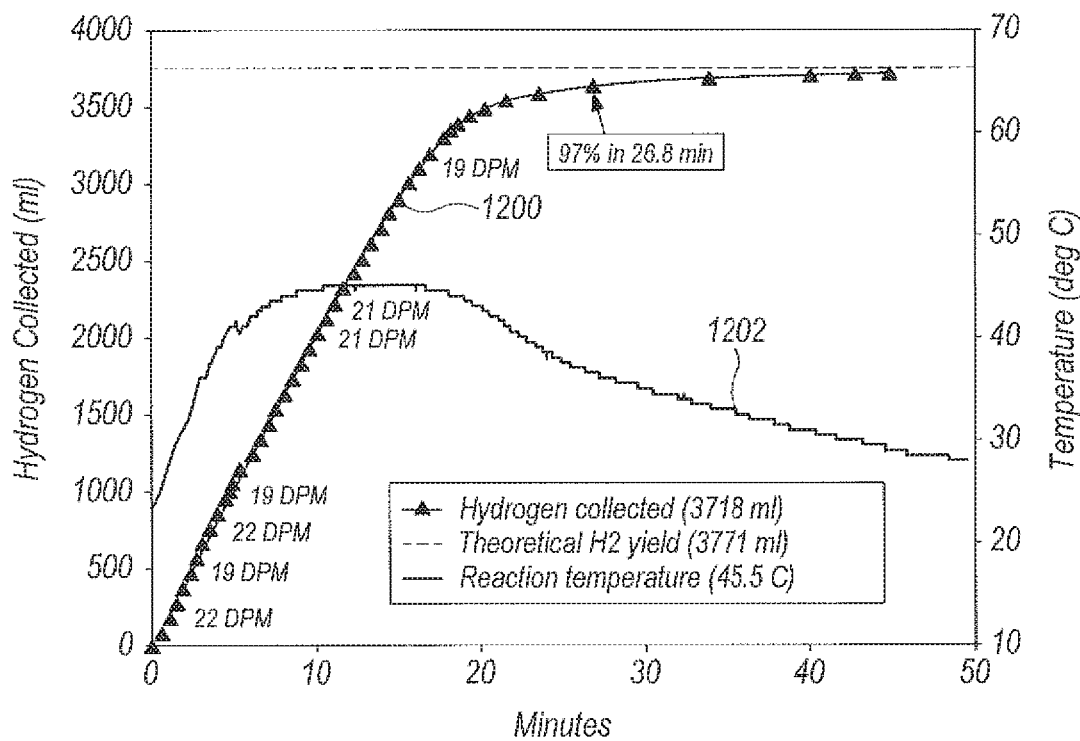
FIG. 12 is a graph of yield and reaction temperature versus time for a pump method for metering $NaBH_4$ dissolved in DI water into $B_2O_3$ in DI water using a peristaltic pump with $\frac{1}{16}^{th}$ inch inside diameter tubing.

Referring now to FIGS. 10-13, FIGS. 10-13 are graphs of yield and temperature for different metering rates. The results from a pump embodiment using $\frac{1}{8}^{th}$ inch inside diameter (ID) pump tubing with DI water are shown in FIG. 10 (yield curve 1000, temperature curve 1002), and with seawater (yield curve 1100, temperature curve 1102) in FIG. 11. Results using $\frac{1}{16}^{th}$ inch ID tubing with DI water are shown in FIG. 12 (yield curve 1200, temperature curve 1202), and with seawater (yield curve 1300, temperature curve 1302) in FIG. 13. As can be seen by FIGS. 10-13, the pump method can allow a more constant delivery rate than the funnel, because the pump method does not depend on the height of the hydrostatic head. When using the pump method with seawater (FIGS. 11 and 13), volume curves 1100 and 1300 undulate ever so slightly, and temperature curves 1102 and 1302 undulate even more so due to the presence of small $H_2$ bubbles in the line. Seawater contains an ingredient that catalyzes the formation of a small amount of $H_2$ gas as the $NaBH_4$-seawater solution is being delivered to the reaction vessel.

Figure 14:
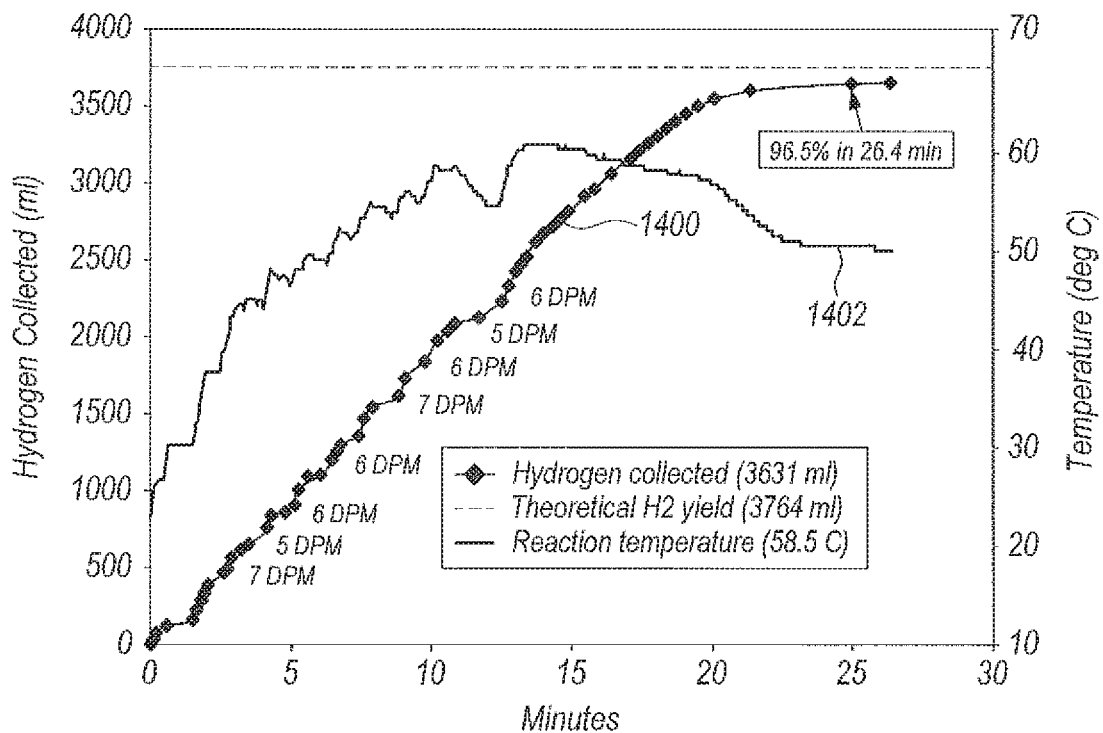
FIG. 14 is a graph of yield and reaction temperature versus time for a pump method for metering $NaBH_4$ dissolved in seawater into $B_2O_3$ in seawater in the ratio of g seawater:g $NaBH_4$=10:1, using a peristaltic pump with $\frac{1}{16}^{th}$ inch inside diameter tubing.

Referring now to FIG. 14, a graph of yield (curve 1400) and temperature (curve 1402) versus time is shown which can illustrate a limit to the use of $B_2O_3$ as an accelerator. For the curve 1400 in FIG. 14 the ratio g $B_2O_3$:g $NaBH_4$ can remain the same (1:1) but the amount of seawater used as a reactant can be reduced so that ratio g seawater:g $NaBH_4$=10:1. A pump (not shown) can deliver $NaBH_4$ in 10 ml seawater into $B_2O_3$ in 5 ml seawater. The temperature and volume undulations are more pronounced than in the 20:1 case (FIG. 13). The $NaBH_4$ can be twice as concentrated so there are more frequent and larger bubbles in the delivery line. Only 0.11 g of $B_2O_3$ are available to the $NaBH_4$ coming in because of the limited solubility of $B_2O_3$ (2.2 g/100 g $H_2O$ at 20 C). The time it takes for the $B_2O_3$ to dissolve causes less $NaBH_4$ to react so that the temperature decreases. Results are summarized in Table 4 below (last line item). This reduced water approach can be useful for applications which are space and weight-limited.

From the above, it can be inferred that the difference in the order of metering for the $NaBH_4/B_2O_3$ system and the $NaHSO_4/NaBH_4$ system previously discussed can be important. For some embodiments, delivery of $NaBH_4$ into accelerator $B_2O_3$ can be optimal, since $NaBH_4$ is extremely soluble in $H_2O$ (55 g/100 g $H_2O$ at 20° C.) while $B_2O_3$ has limited solubility. However, unlike the transition metal catalysts, the acid accelerators participate in the hydrogen generation reaction so that $B_2O_3$ will become more soluble as the reaction proceeds. For other embodiments, the $NaHSO_4/NaBH_4$ system, delivery of accelerator $NaHSO_4$ into $NaBH_4$ can be recommended since the $NaBH_4$ can be kept isolated, and cannot be given the opportunity to form $H_2$ bubbles in the delivery line. $NaHSO_4$ is relatively soluble in $H_2O$ so that all the $NaHSO_4$ will be dissolved in the solution to be delivered prior to delivery. Since the solubility of $NaHSO_4$ is 2.57 g/9 ml at 25° C., the ratio g seawater:g $NaBH_4$ can be reduced from 20:1 to 9:1. This lower limit makes available an amount of $NaHSO_4$ that is still larger than the 2.3 g that is required for each 1.5 g $NaBH_4$.

Figure 15:
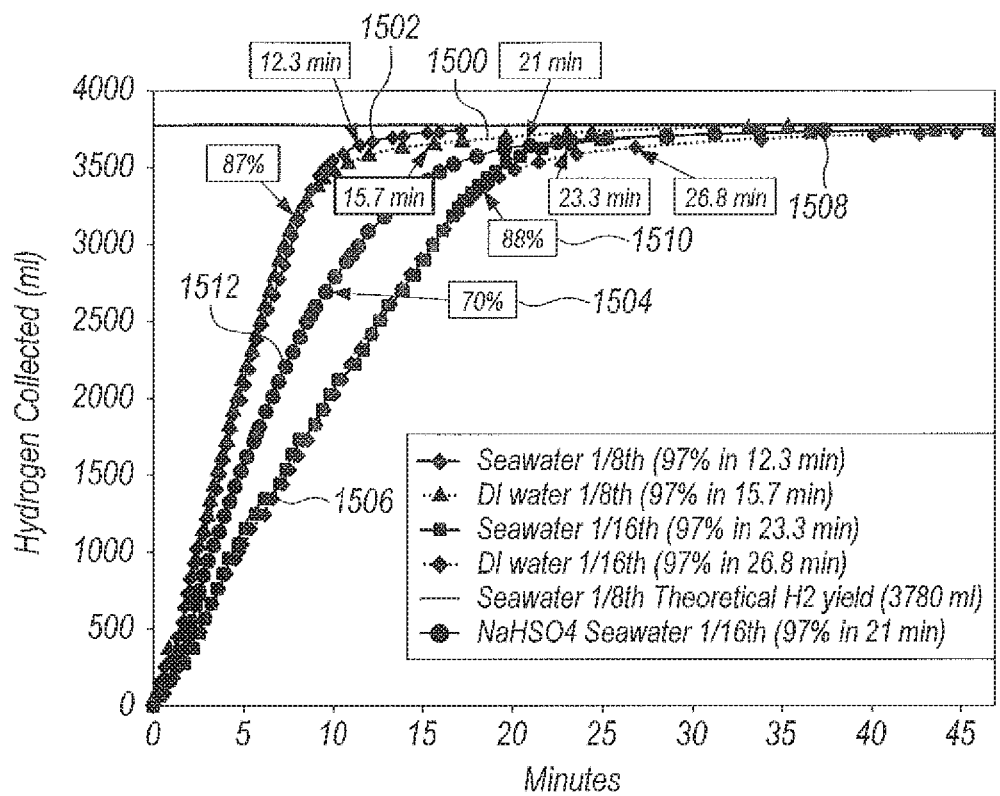
FIG. 15 is a graph of yield and reaction temperature versus time for metering $NaBH_4$ solution into $B_2O_3$ seawater solution, which compares yields of a peristaltic pump with seawater and DI water solution using $\frac{1}{16}^{th}$ inch inside diameter tubing and $\frac{1}{8}^{th}$ inch inside diameter tubing.

Referring now to FIG. 15, a graph of yield versus time for pump delivery embodiments is shown. As shown in FIG. 15, if one compares the time to 97% completion for DI water using $\frac{1}{8}^{th}$ inch inside diameter (ID) tubing (15.7 minutes, curve 1500) with seawater using $\frac{1}{8}^{th}$ inch ID tubing (12.3 minutes, curve 1502), it appears that the time for DI water can be significantly longer (in this case 28% longer) than that for seawater even though the flow rates are very similar (2.8 ml/min for DI water and 2.72 ml/min for seawater). However, the difference between the two reaction times is somewhat misleading since the collection curves are nearly identical up to 87% completion. In FIG. 15, an arrow 1504 can show the point of 87% completion. By 87% completion, all the $NaBH_4$ has been delivered into the reaction vessel. Prior to 87% completion the pump is the rate-limiting factor; after 87% completion, the inherent rate of reaction of $NaBH_4$ with $B_2O_3$ is the rate-limiting factor.

The reaction time in seawater is faster than the reaction time in DI water as can be seen by comparing the bulk reaction times for seawater (1.35 minutes, See FIG. 7, curves 700, 702 above) and for DI water (3 minutes, FIG. 6, curve 600). Thus, the major difference in the time to 100% completion between seawater and DI water using a peristaltic pump can be the time that it takes to deliver the last 13% of the hydrogen gas when the pump is not in control. The same effect is observed for tubing size $\frac{1}{16}^{th}$ inch, as shown by curves 1506, 1508 in FIG. 15. The time to 97% completion can be 26.8 minutes in DI water (flow rate 1.2 ml/min) and 23.3 minutes in seawater (flow rate 1.35 ml/min). The two delivery curves are almost superimposable for the first 88% of hydrogen gas delivered. In FIG. 15 an arrow 1510 shows the point of 88% completion.

FIG. 15 shows that, for a given tubing ID when using pump delivery embodiments, the slopes of the hydrogen collected vs. time curves are almost identical for seawater and DI water in the regime where the pump is controlling delivery of $NaBH_4$ into accelerator $B_2O_3$, i.e., during the first 87%-88% of the reaction. Also included is a seawater curve for metering acid accelerator $NaHSO_4$ into $NaBH_4$, curve 1512. The curve 1512 can turn over earlier (at approximately 70%) due to the stoichiometric insufficiency of the amount of $NaHSO_4$ used, when compared to reactions that can use $B_2O_3$ as an accelerator.

Figure 16:
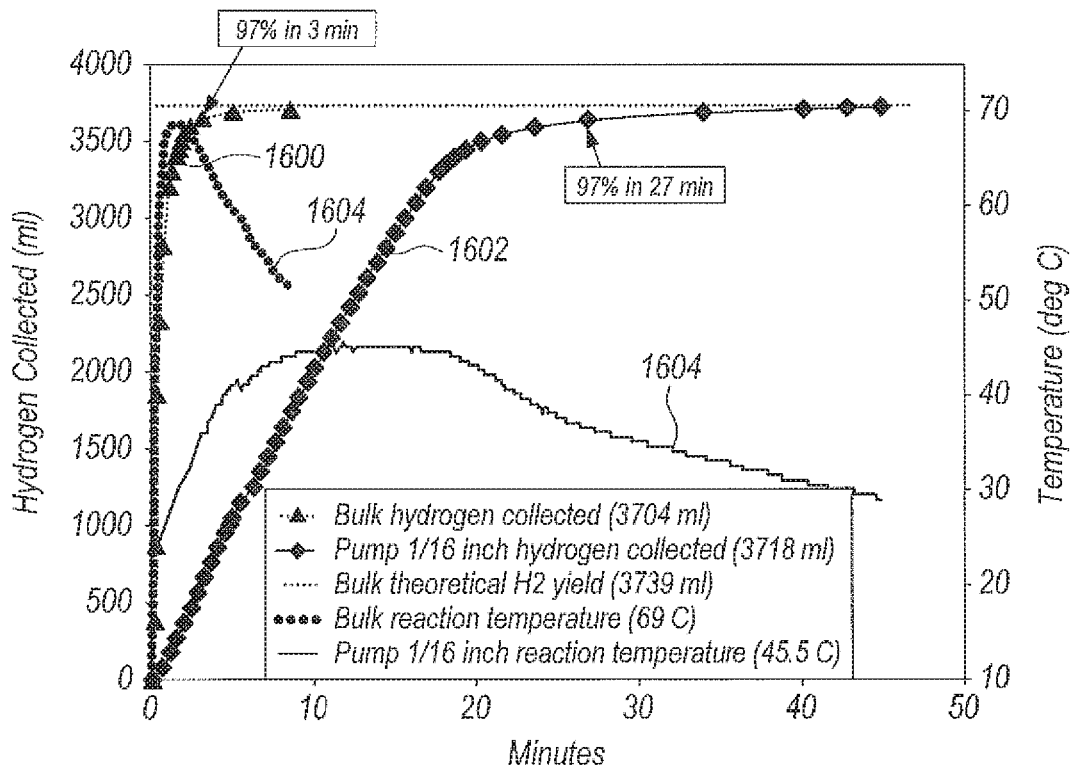
FIG. 16 is a graph of yield versus time for a pump method for metering $NaBH_4$ dissolved in DI water which compares yield versus time for bulk addition versus use of a peristaltic pump with $\frac{1}{16}^{th}$ inch ID tubing.
Figure 17:
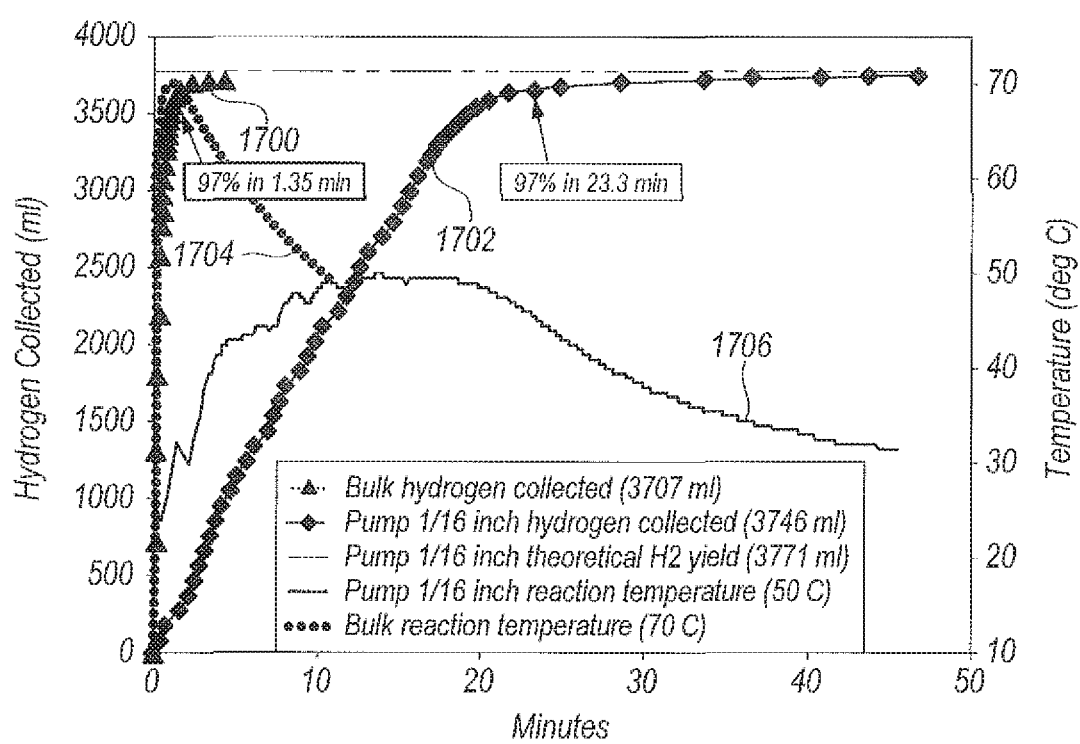
FIG. 17 is the same graph as FIG. 16, but for metering $NaBH_4$ dissolved in seawater.

Referring now to FIGS. 16-17, FIG. 16 can include graphs of yield (curves 1600, 1602) and reaction temperature (cures 1604, 1606) versus time, which can illustrate the range of reaction times that can be obtainable with bulk addition of accelerator $B_2O_3$ using DI water. Bulk addition is 97% complete in 3 minutes (curve 1600); metering with pump with $\frac{1}{16}^{th}$ inch tubing, in 27 minutes (curve 1602), which can be an increase in reaction by roughly a factor of 9. Results are given in Table 3 below.

TABLE 3

DI Water as a Reactant Using Accelerator $B_2O_3$
Ratio g $B_2O_3$:g $NaBH_4$ = 1:1; g $H_2O$:g $NaBH_4$ = 20:1

| Delivery Method | Tube ID (inch) | Peak Temperature (deg C.) | % Completion | Reaction time (min) |
|---|---|---|---|---|
| Bulk | NA | 69 | 97 | 3 |
| Addition funnel | NA | 59 | 97 | 12 |
| Peristaltic pump | 1/8 | 55 | 97 | 15.7 |
| Peristaltic pump | 1/16 | 45.5 | 96.7 | 26.8 |

FIG. 17 includes graphs of yield (curves 1700, 1702) and reaction temperature (1704, 1706) versus time, which can show the range of reaction times obtainable with seawater. Bulk addition is 97% complete in 1.35 minutes (curve 1700); metering with pump with 1/16$^{th}$ inch ID tubing in 23.3 minutes (curve 1702).

Figure 18:
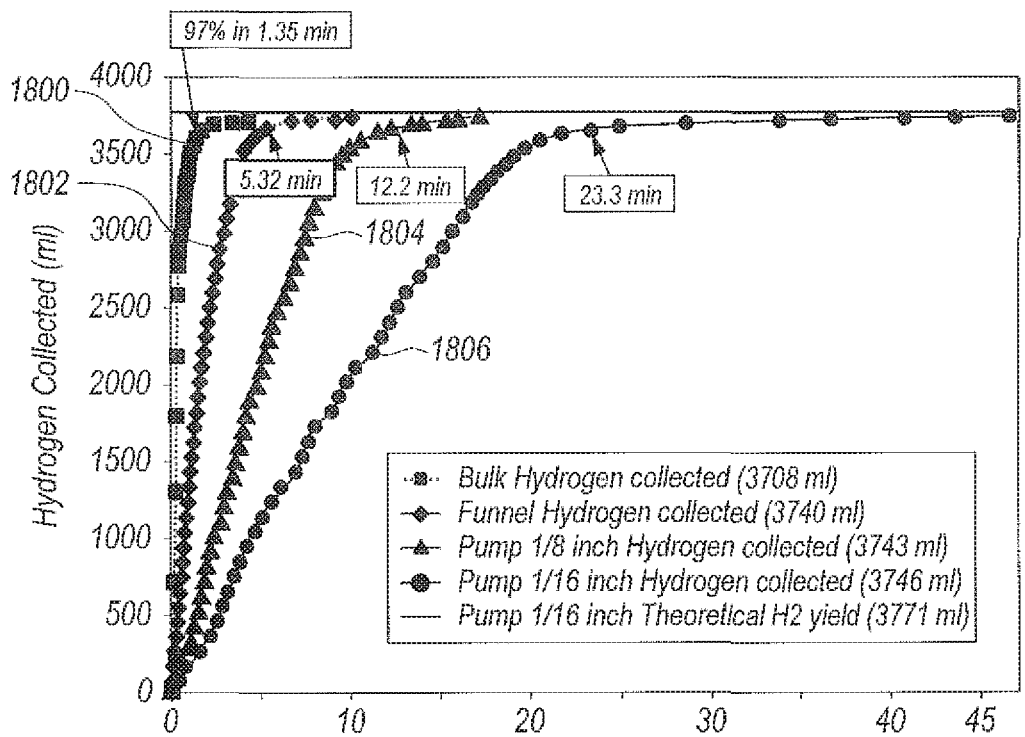
FIG. 18 is a graph of yield versus time where seawater is a reactant with $NaBH_4$ and accelerator $B_2O_3$, which compares the yield versus time for bulk, funnel, and pump with $\frac{1}{8}^{th}$ and $\frac{1}{16}^{th}$ ID tube metering methods.
Figure 19:
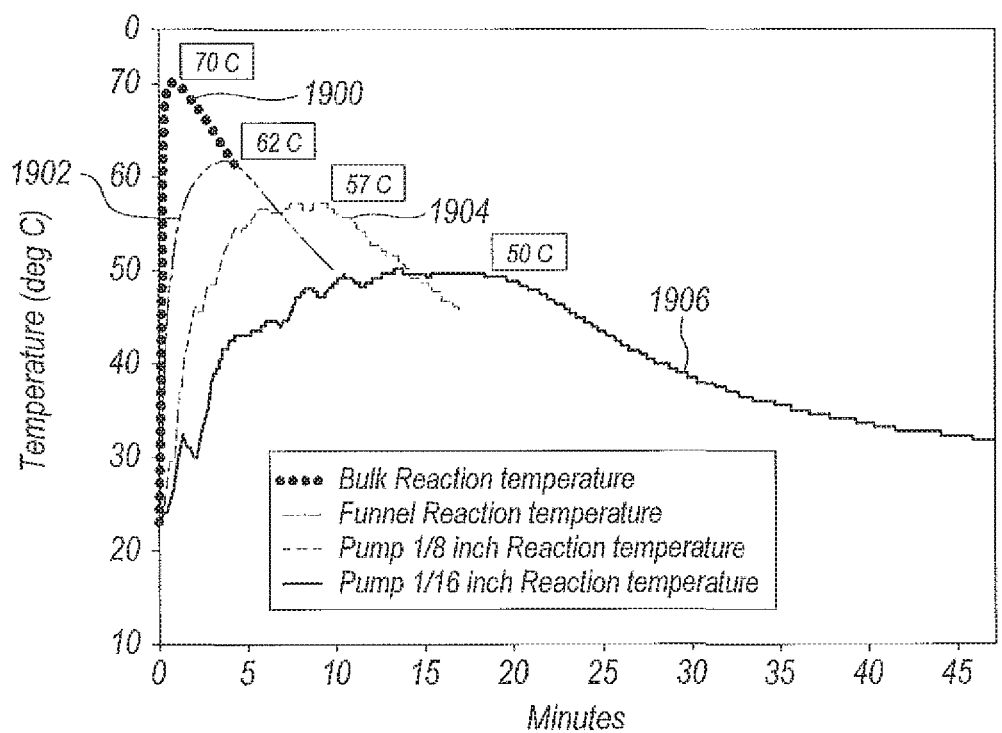
FIG. 19 is a graph of temperature versus time, with the same x-axis as FIG. 18, where seawater is a reactant with $NaBH_4$ and accelerator $B_2O_3$, which compares bulk, funnel, and pump with $\frac{1}{8}^{th}$ and $\frac{1}{16}^{th}$ ID tube delivery methods.

Referring now to FIGS. 18-19, FIGS. 18-19 can illustrate a summary of reaction yield curves versus time (FIG. 18) and peak temperatures versus time (FIG. 19) with accelerator $B_2O_3$ using seawater as the reactant. The various methods of delivering $NaBH_4$ in $B_2O_3$ solution are compared: bulk (curves 1800 and 1900), funnel (curves 1802 and 1902), pump with 1/8$^{th}$ inch ID tubing (curves 1804 and 1904), and pump with 1/16$^{th}$ inch ID tubing (curves 1806 and 1906). Results can further be summarized in Table 4 below.

TABLE 4

Seawater as a Reactant Using Accelerator $B_2O_3$
Ratio g $B_2O_3$:g $NaBH_4$ = 1:1

| Delivery Method | Ratio g seawater:g $NaBH_4$ | Tube ID (inch) | Peak Temperature (deg C.) | % Completion | Reaction time (min) |
|---|---|---|---|---|---|
| Bulk | 20:1 | NA | 70 | 97 | 1.35 |
| Addition funnel | 20:1 | NA | 62 | 96.7 | 5.32 |
| Peristaltic pump | 20:1 | 1/8 | 57 | 97 | 12.3 |
| Peristaltic pump | 20:1 | 1/16 | 50.5 | 97 | 23.3 |
| Peristaltic pump | 10:1 | 1/16 | 58.5 | 96.5 | 26.4 |

Table 4 above shows that for seawater using metering of accelerator, the peak temperature can be decreased almost 20 degrees and the reaction time can be made longer by a factor of 17 above bulk addition. Metering $NaBH_4$/seawater into accelerator $B_2O_3$/seawater (or $NaHSO_4$/seawater into $NaBH_4$/seawater in some embodiments) can allow the reaction time and temperature to be tailored to the requirements of a particular application. But in all cases, the reaction goes to completion in seawater, which can meet the efficiency needs of the Department of the Navy for underwater fuel cells.

Figure 20:
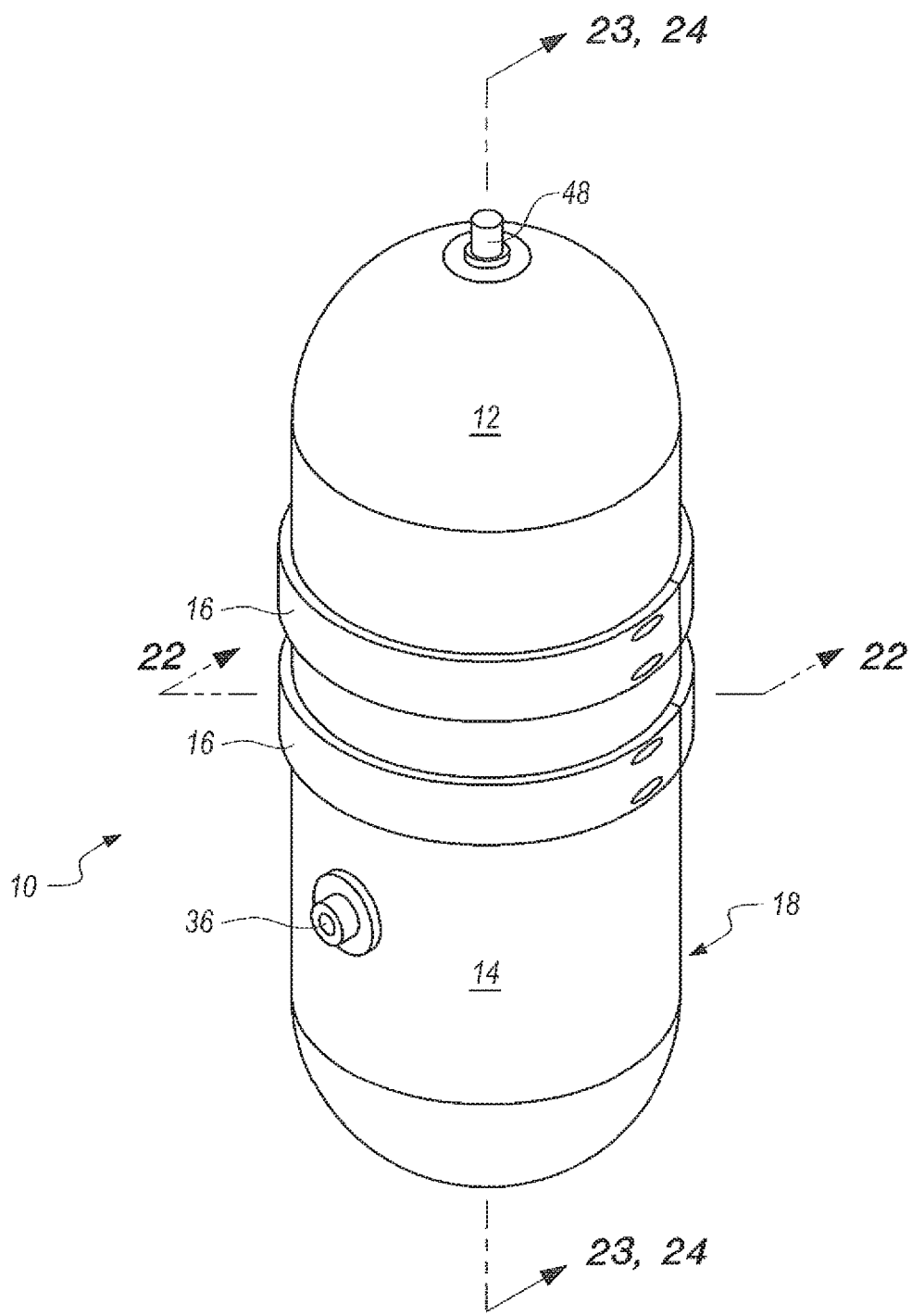
FIG. 20 is a side elevational view of the underwater hydrogen generator of the present invention according to several embodiments.
Figure 21:
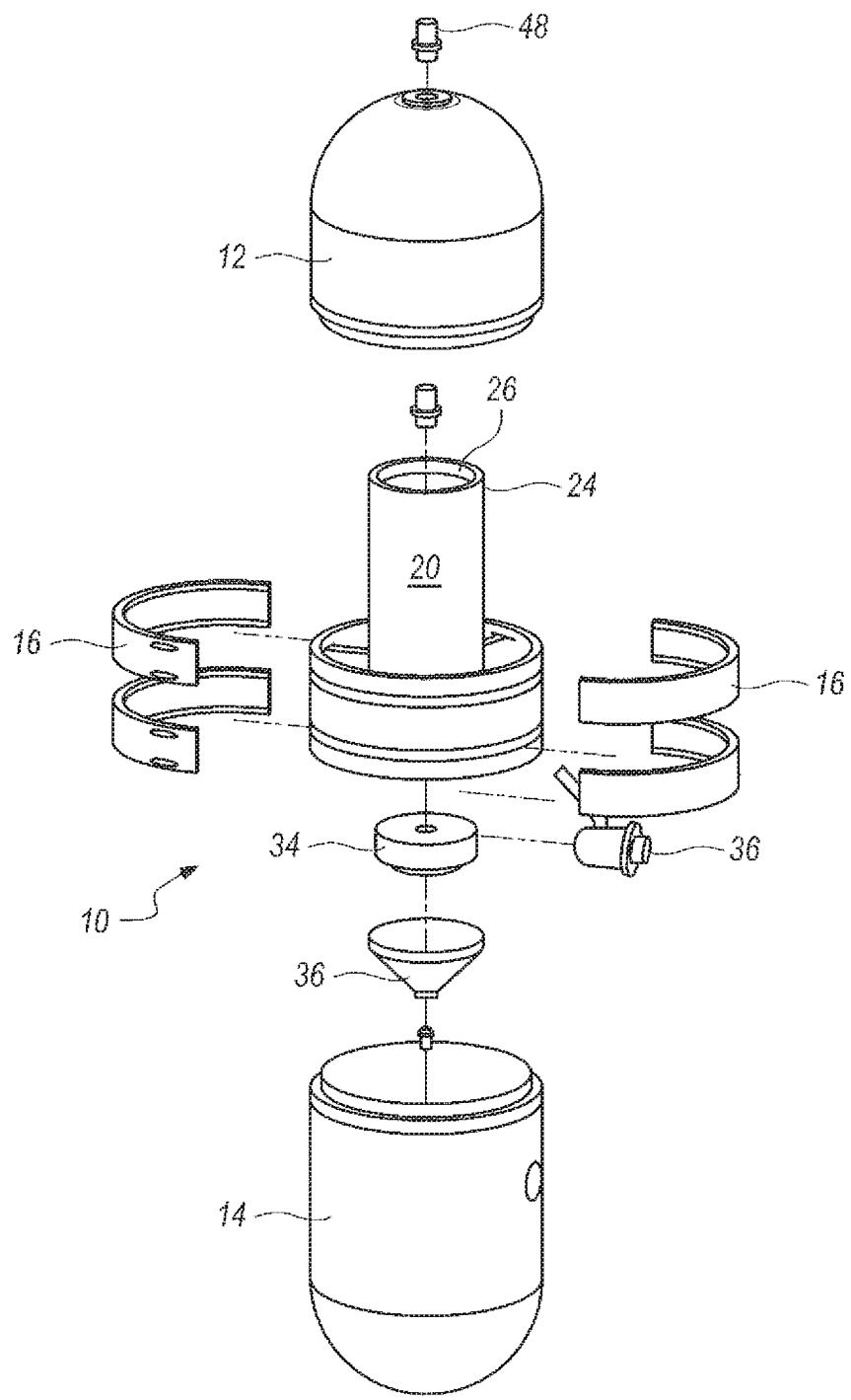
FIG. 21 is a an exploded side elevational view of the generator of FIG. 20, with weighted piston removed for clarity.

Referring now to FIG. 20-24, an apparatus for the underwater generation of hydrogen gas using seawater as a reactant in the ocean environment is shown, and can be generally described using reference character 10. As shown in FIGS. 20-21, apparatus 10 can include an upper part 12 and a lower part 14 that can be placed together and assembled with retaining rings 16 to establish a watertight housing 18.

Figure 22:
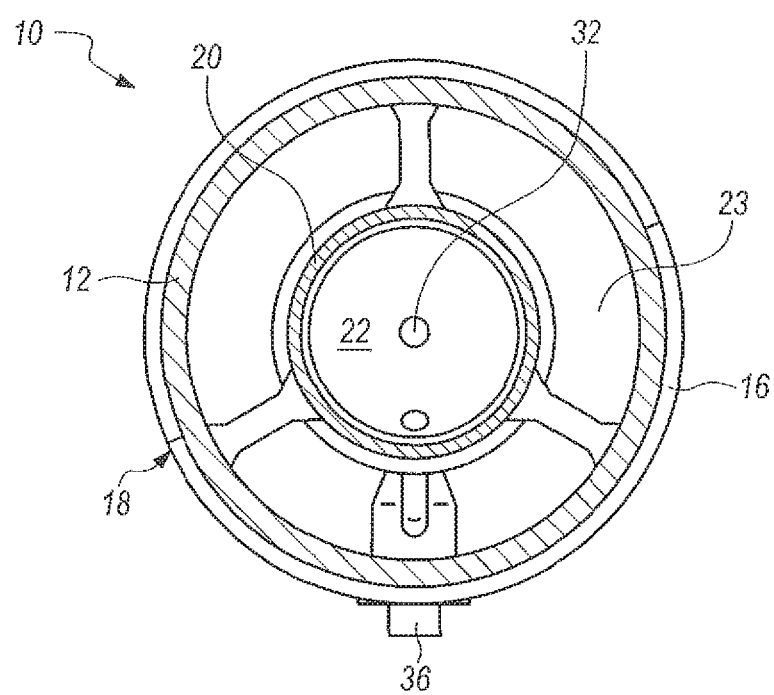
FIG. 22 is a cross-sectional view taken along line 22-22 in FIG. 20.
Figure 23:
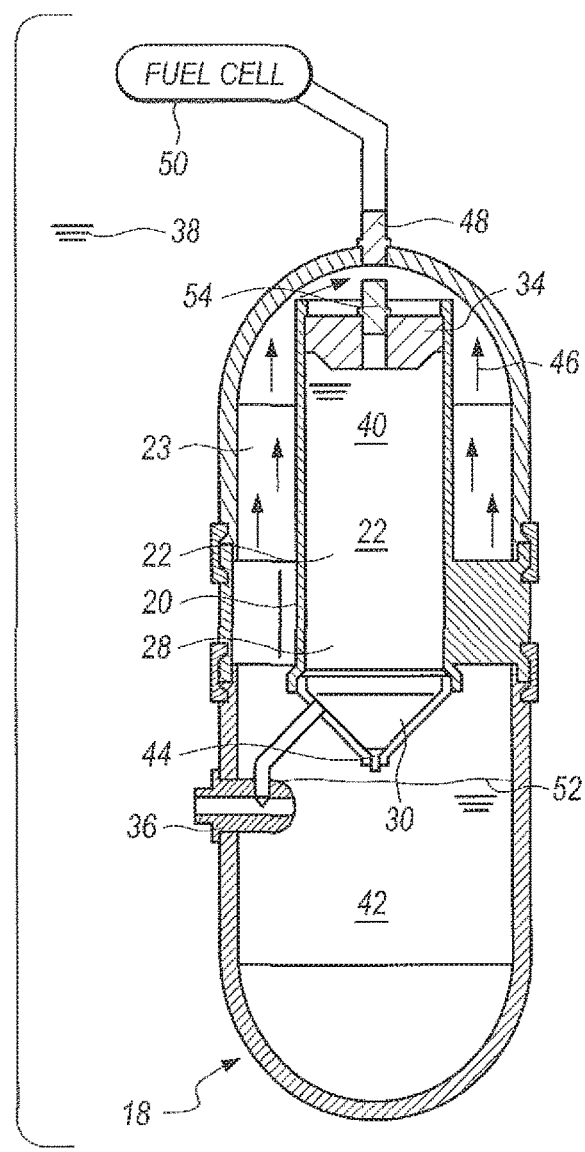
FIG. 23 is a cross-sectional view taken along line 23-23 in FIG. 20 at the beginning of the hydrogen generating process according to some embodiments of the present invention.
Figure 24:
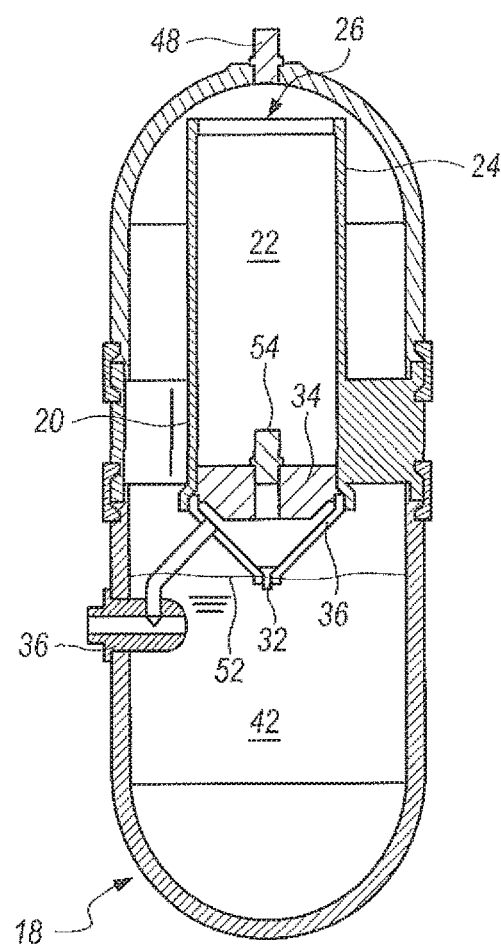
FIG. 24 is the same view as FIG. 23, but substantially at the end of the hydrogen generating process; and, FIG. 25 is a block diagram, which represents steps that can be taken to accomplish the methods of the present invention according to several embodiments.

As shown in FIGS. 20-21, watertight housing 18 can enclose a metering casing 20 so that housing 18 is concentric to casing 20, as perhaps can best be 4seen in the cross-sectional top view in FIG. 22. Housing 18 and casing 20 can cooperate to establish an annular reaction void 23 (FIGS. 22-24) and metering casing 20 can define a metering chamber 22. As shown in FIGS. 21 and 23-24, metering casing 20 can have an upper portion 24 that terminates at a piston opening 26. Proceeding downwardly from piston opening 26, upper portion can further merge into lower portion 28. Lower portion 28 can further merge into a funnel 30, which can terminate at a metering opening 32. A weighted piston 34 can be placed in piston opening 26, as shown in FIGS. 23-24. Generator 10 (as used herein "apparatus" and "generator" can be taken to have the same meaning) can further include a three way seawater valve 36, which can be placed in fluid communication with the reactant 42 (or accelerator 40, according to the embodiment being practiced) in the metering chamber 22 and the annular reaction void 23.

FIG. 23 can be a cross-sectional view of the underwater apparatus 10 in a start configuration, i.e., when initially submerged in seawater 38 and at the beginning of the hydrogen generation process. As shown, metering chamber 22 has been filled with accelerator 40 and weighted piston 34 can be positioned in the upper portion 24 of casing 20, proximate piston opening 26. Reactant 42 can be in annular void 23. Once submerged, a path of fluid communication can be established from seawater 38 through seawater valve 36 to metering chamber 20, as well as from seawater 38 through seawater valve 36 and into reaction void 23, which can be filled with $NaBH_4$ 42 granules or shaped pellets. Initially, the granules or shaped pellets can have a packing factor of about fifty percent (50%) so that the $NaBH_4$ can readily accept seawater and dissolve. Seawater combines with accelerator 40 and can pass through metering opening 32 into reaction void 23 (note that metering opening 32 can be sized to deliver a desired flow rate of accelerator/seawater into reaction void 23, as described above. Additionally, a dissolvable plug 44 can be installed in metering opening while apparatus 10 is stored. The plug material properties can ensure that the plug can dissolve when it contacts water.

As accelerator 40 passes into reaction void 23, it combines with the seawater/$NaBH_4$ solution, and hydrogen gas is generated, as indicated by arrows 46. The hydrogen gas rises and passes through exit port 48, where it is used by an $H_2/O_2$ fuel cell, indicated generally in FIG. 23 by reference character 50.

FIG. 24 is a cross-sectional view of the generator 10 once the hydrogen-containing material or the accelerator have been delivered, i.e., when generator 10 is in a finished configuration. As shown, plug 44 has dissolved, and the accelerator 40 has mixed with seawater and dripped through metering opening 32. The weight of weighted piston 34 can urge piston downward through metering chamber 22, which can accomplish a syringe-like effect to urge all of the accelerator 40/seawater 38 combination through metering opening 32 and into reaction void 23 for the reaction to generate hydrogen. At the end of the delivery process, weighted piston 34 has passed through metering chamber 24 and can rest in contact with the inner surface of funnel 30.

Given the solubility of $NaHSO_4$ and $NaBH_4$ as described earlier, these constituents could be used in the metering chamber 22 depending on which acid accelerator 40 can be used, $NaHSO_4$ or $B_2O_3$ respectively. As designed for a 20:1 g $H_2O$ per g $NaBH_4$ ratio, the metering chamber 22 can contain one-fourth of the reactant volume and the reaction void 23 can contain the remainder of the reactants. A water ratio of 5:1 water to reactant will be used in the metering chamber 22; the remainder of the water for the reaction can be added to the reaction void 23. However, a reduction in volume of the reactants and consequently chamber volume can be achieved by lowering this ratio directly. For example, if a 10:1 g $H_2O$ per g $NaBH_4$ ratio is desired for the same amount of $NaBH_4$, a water ratio of 2.5:1 water to reactant will be used in the metering chamber; 3 parts seawater containing the remaining reactant 42 can be added to the reaction void 23. The use of less water can allow the size and weight of the apparatus 10 to be reduced.

Seawater 38 can be added by various means, including but not limited to a peristaltic or other type of pump (not shown in the Figures) or by taking advantage of the ambient pressure around the generator 10, when generator 10 is submerged at some minimum depth (as shown in FIGS. 23-24). This minimum depth also allows for hydrogen generation in sea surface applications. In any case, the water is added until the weighted piston 34 in the metering chamber 22 reaches its maximum height, and a float valve or sensor can be tripped, either blocking flow through valve 36 or diverting it, to allow the operation of generator 10. Alternatively, a lip can be placed on casing 22 immediately proximate to opening 26, to prevent weighted piston 34 from being pushed out of casing 22 during operation of the apparatus 10.

For operation, water can be added by either flooding the metering chamber 22 or pumping seawater into the metering chamber 22. It can important to note that the reaction void 23 must not be filled completely. A free volume of gas above the reaction level 52 is required such that the reaction volume can expand due to release of hydrogen gas. The total free volume above the reaction level will dictate the maximum flow rate. This can be necessary to prevent reactants or foam from being pushed out of the top of the apparatus 10. A pressure relief valve 54 in the metering chamber 22 can prevent high pressure gas from causing the generator 10 to meter too quickly. As mentioned above, a dissolving plug 44 may be added in metering opening 32 to prevent the metering chamber 22 from metering accelerator before the chamber 22 is filled.

In some cases (such as when $NaBH_4$ exists in metering casing 20) a small amount of gas can be formed in casing 20. The gas reaction cannot be mitigated by pressure, thus additional pressure can lead to a differential pressure in the chambers. This will increase delivery rates. If there were no valve 54, this would occur. In the case where there is no excess gas in casing 20 the small travel space in such a valve would prohibit the fluid from escaping beyond reason (which is what would happen if the piston had a hole). Because $NaBH_4$ would react with seawater to some degree, the valve 54 can keep the differential between metering casing 20 and reaction housing 18 at a controlled level. Reaction housing 18 does not necessarily need a relief valve, but increased pressure in 18 as a whole makes the product much less laden with water vapor. Because the reaction and device are agnostic to temperature (no thermal runaway), allowing a high temperature in the system is acceptable to some degree.

One good way of limiting water vapor in the hydrogen product can be increasing internal pressure since water vapor partial pressure is dependent only on temperature. Thus a higher chamber pressure will intentionally limit the water vapor output in terms of percentage of total gas out. Lastly, it is important to note that if the chamber exists with 1 atmosphere (atm) outside the chamber and there is no valve in reaction housing 18, the reaction will occur at 1 atm and will allow water to naturally limit the temperature of the reaction through its heat of vaporization. Thus the system cannot increase beyond 100° C., and likely will not exceed ~95° C. regardless of rate of reaction. Obviously, the reaction rate is limited by "foam" volume. This foam has been shown to be the hydrogen gas forming in solution. A higher pressure chamber 22 can also decrease the size of the bubbles and thus the level of foam.

As mentioned above, water can be cut off from the metering chamber as mentioned when the weighted piston reaches its highest point, analogous to when a syringe is fully extended. Water can be cut off from entering the lower chamber by either a diverter valve, an automatic float valve, or an electric controlled valve. If a pump is used, that pump will be turned off once the chamber is full unless the pump will be used to circulate fresh seawater as a cooling method in the reaction void through cooling coils (not shown). Once the plug in the funnel has dissolved, or once the diastolic pump is activated, the metering through the funnel can begin. The weighted piston will continue to provide consistent head to either method for a more uniform flow.

The hydrogen generation reaction of the present invention according to several embodiments can continue to completion and hydrogen gas is collected from the upper relief valve. To reduce foam or reactant level, a high pressure relief valve may be used. It is important to note that the metering chamber 22 can be automatically pressure compensated when higher pressures are used as long as the top side of the piston is open to the reaction void. To achieve a faster reaction with a smaller chamber, or more consistent gas temperature, active cooling could be employed. It is important to note that higher temperatures will increase water vapor in the product gas. Water vapor can be additionally reduced by operating at a higher pressure in the module.

For setup and storage, placement of the chemicals could be accomplished during module assembly of upper part 12 and lower part 14 with retaining rings 16. Since the module will be stored without water, it can remain in an assembled and "loaded" state for long periods of time. The $NaBH_4$ and acid accelerator disclosed above are stable under a wide range of temperature, pressure and humidity conditions.

The systems and methods of the present invention can allow for the use of acid accelerator $B_2O_3$ for hydrogen generation using seawater as a reactant. The fact that $B_2O_3$ is not poisoned by seawater like the traditional transition metal catalysts used for hydrogen generation can be extremely advantageous for the present invention according to several embodiments. The use of metering to deliver the accelerator or the $NaBH_4$ can also be advantageous as well as the fact that the methods of the present invention are order-agnostic. That is, the acid accelerator 40 ($NaHSO_4$) can be placed in the metering chamber 22 and can be metered into the $NaBH_4$ reactant 42 in the annular reaction void 23, or vice versa, i.e., the $NaBH_4$ reactant 42 can be placed in the metering chamber and metered into the acid accelerator 40 in the annular reaction void 23. Still further, the reaction of sodium borohydride with $B_2O_3$, as opposed to transition metal catalysts, can result in a lower pH reaction product, tetraborate $Na_2B_4O_7$, which can be less corrosive than metaborate $NaBO_2$.

Figure 25:
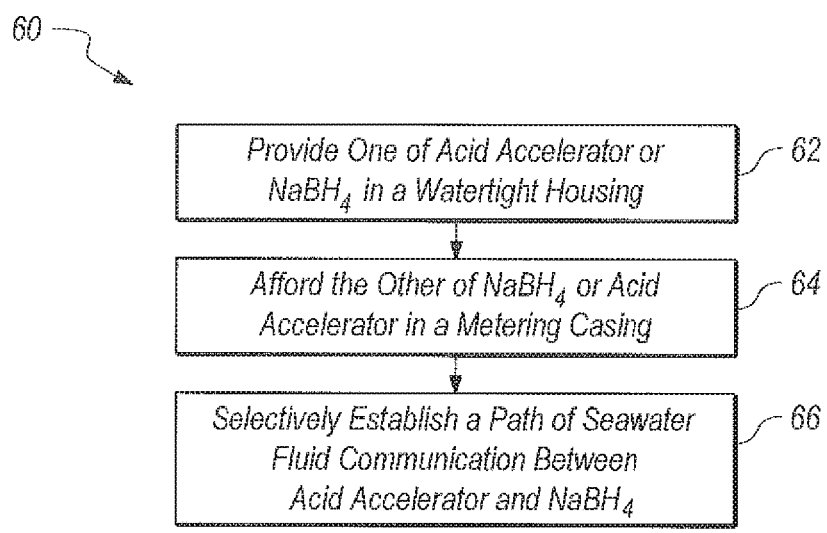

Referring now to FIG. 25, a block diagram 60 is shown, which can be representative of steps that can be taken to accomplish the methods of the present invention according to several embodiments. As shown method 60 can include the initial step 62 of providing one of the acid accelerator 40 or the sodium borohydride reactant 42 in the watertight housing 18, and more specifically in annular reaction void 23 of housing 18. Method 60 can further include the step 64 of affording the other of the sodium borohydride reactant 42 or the acid accelerator 40 ($NaHSO_4$) in metering chamber 22 of casing 20. Finally, the methods can include the step 66 is selectively establishing a path of seawater fluid communication between a submerged seawater environment and metering chamber 22, as well as reaction void 23. The structure for the accomplishing the methods above, as well as the materials for the acid accelerator and ratios to be used, can be as described above.

The use of the terms "a" and "an" and "the" and similar references in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for the production of hydrogen gas using seawater as a reactant comprising:
   placing sodium borohydride ($NaBH_4$) in a first chamber;
   placing an acid accelerator in a second chamber;
   adding a respective first portion of the seawater for the first chamber into the first chamber and a respective second portion of the seawater for the second chamber into the second chamber, wherein the respective first portion of the seawater dissolves the sodium borohydride in the first chamber to form a solution and the respective second portion of the seawater dissolves or partially dissolves the acid accelerator in the second chamber to form a mixture;
   combining the solution and the mixture in a reaction chamber, which is one of the first and second chambers; and
   producing the hydrogen gas from a chemical reaction among the sodium borohydride, the acid accelerator, and the seawater from the solution and the mixture combined in the reaction chamber.

2. The method of claim 1 further comprising:
   in dry form, storing the placed sodium borohydride in the first chamber and the placed acid accelerator in the second chamber for a year before the adding of the seawater into the first and second chambers.

3. The method of claim 1, further comprising:
   cutting off the adding the seawater into the first and second chambers before the combining of the solution and the mixture.

4. The method of claim 1, wherein:
   the first and second chambers are a metering chamber and the reaction chamber, which is the one of the first and second chambers; and
   the combining of the solution and the mixture includes metering one of the solution and the mixture from the metering chamber through a metering opening into the reaction chamber.

5. The method of claim 4, wherein the adding of the seawater into the first and second chambers includes:
   adding the respective portion for the metering chamber into the metering chamber until the metering chamber is full; and
   adding the respective portion for the reaction chamber into the reaction chamber until the reaction chamber is partially filled to a controlled level below a free volume sufficient to prevent foam generated during the chemical reaction from being pushed into the hydrogen gas exiting the reaction chamber.

6. The method of claim 5, wherein:
   the placing the sodium borohydride in the first chamber includes placing the sodium borohydride in the first chamber that is the reaction chamber;
   the placing the acid accelerator in the second chamber includes placing the acid accelerator that is $NaHSO_4$ in the second chamber that is the metering chamber;
   the adding the respective portion for the reaction chamber into the reaction chamber includes adding the respective portion for the reaction chamber into the reaction chamber until the reaction chamber is partially filled to the controlled level of the solution of the sodium borohydride; and
   the adding the respective portion for the metering chamber into the metering chamber includes adding the respective portion for the metering chamber into the metering chamber until the metering chamber is full of the mixture that is another solution of the $NaHSO_4$ in the respective portion of the seawater.

7. The method of claim 5, wherein:
   the placing the sodium borohydride in the first chamber includes placing the sodium borohydride in the first chamber that is the metering chamber;
   the placing the acid accelerator in the second chamber includes placing the acid accelerator that is boric oxide ($B_2O_3$) in the second chamber that is the reaction chamber;
   the adding the respective portion for the metering chamber into the metering chamber includes adding the respective portion for the metering chamber into the metering chamber until the metering chamber is full of the solution of the sodium borohydride; and
   the adding the respective portion for the reaction chamber into the reaction chamber includes adding the respective portion for the reaction chamber into the reaction chamber until the reaction chamber is partially filled to the controlled level of the mixture, which includes an undissolved portion of the boric oxide and a solution of a remaining portion of the boric oxide in the respective portion of the seawater, the undissolved portion dissolving and disappearing during the chemical reaction.

8. The method of claim 1, further comprising:
collecting the hydrogen gas produced from the chemical reaction, wherein a quantity of the collected hydrogen gas exceeds 90% of a theoretical yield from a stoichiometry of the chemical reaction based on a quantity of the sodium borohydride that is all of the sodium borohydride.

* * * * *